US012116245B2

(12) United States Patent
Cui et al.

(10) Patent No.: US 12,116,245 B2
(45) Date of Patent: Oct. 15, 2024

(54) LIFTING OF BUILDING UNITS

(71) Applicant: Illinois Tool Works Inc., Glenview, IL (US)

(72) Inventors: Nick Cui, Narre Warren (AU); Bernard Kennelly, North Balgowlah (AU); Frank Davern, Newport (AU)

(73) Assignee: Illinois Tool Works Inc., Glenview, IL (US)

( * ) Notice: Subject to any disclaimer, the term of this patent is extended or adjusted under 35 U.S.C. 154(b) by 127 days.

(21) Appl. No.: 17/901,388

(22) Filed: Sep. 1, 2022

(65) Prior Publication Data

US 2022/0411231 A1 Dec. 29, 2022

Related U.S. Application Data

(63) Continuation of application No. 16/924,803, filed on Jul. 9, 2020, now Pat. No. 11,453,575, which is a (Continued)

(30) Foreign Application Priority Data

Jul. 14, 2014 (AU) ................................ 2014902708

(51) Int. Cl.
*E04G 21/14* (2006.01)
*B66C 1/66* (2006.01)
*E04B 1/35* (2006.01)

(52) U.S. Cl.
CPC ................ *B66C 1/66* (2013.01); *B66C 1/666* (2013.01); *E04B 1/35* (2013.01); *E04G 21/142* (2013.01)

(58) Field of Classification Search
CPC ................. Y10T 24/1498; Y10T 24/14; Y10T 24/45246; E04G 21/142; F16L 3/137; E04B 1/35; B66C 1/66; B66C 1/666
See application file for complete search history.

(56) References Cited

U.S. PATENT DOCUMENTS 2,886,370 A 5/1959 Liebert
3,232,568 A 2/1966 Lennon et al.
(Continued)

FOREIGN PATENT DOCUMENTS

FR 2377501 A1 8/1978
GB 1162416 A 8/1969
(Continued)

OTHER PUBLICATIONS

"Extended European Search Report" , European Application No. 18196378.6 (7 pages) , Jan. 4, 2019.
(Continued)

*Primary Examiner* — Brian E Glessner
*Assistant Examiner* — Daniel J Kenny
(74) *Attorney, Agent, or Firm* — Neal, Gerber & Eisenberg LLP

(57) ABSTRACT

There is disclosed a lifting attachment for a building unit comprising sheeting and a support structure over which the sheeting is disposed, the attachment being configured such that it can be connected to or integrated into the support structure and comprising a lifting anchor that, when the attachment is so connected or integrated, is engageable by a component for lifting the unit such that a releasable inter-connection between the component and the support structure passes through an opening in the sheeting.

17 Claims, 16 Drawing Sheets

Related U.S. Application Data continuation of application No. 15/326,353, filed as application No. PCT/IB2015/000145 on Feb. 2, 2015, now Pat. No. 10,752,471.

(56) References Cited

U.S. PATENT DOCUMENTS

| | | | | |
|---|---|---|---|---|
| 3,632,071 | A * | 1/1972 | Cameron | F16L 3/10 248/205.3 |
| 3,760,540 | A | 9/1973 | Latoria et al. | |
| 3,848,381 | A * | 11/1974 | Bloxom | E04B 5/04 52/262 |
| 3,990,197 | A * | 11/1976 | Johnston | E04B 1/34838 52/125.2 |
| 4,283,890 | A * | 8/1981 | Takeda | E04H 5/02 108/51.11 |
| 4,304,431 | A | 12/1981 | Walston | |
| 4,805,856 | A * | 2/1989 | Nicoli | F16L 3/233 292/307 R |
| 4,807,410 | A * | 2/1989 | Skvaril | E04B 1/34321 206/321 |
| 4,908,925 | A | 3/1990 | Johnson | |
| 5,730,522 | A | 3/1998 | Wyke et al. | |
| 5,846,018 | A | 12/1998 | Frobosilo et al. | |
| 5,857,296 | A | 1/1999 | Niday et al. | |
| 6,508,447 | B1 | 1/2003 | Catani et al. | |
| 6,688,808 | B2 | 2/2004 | Lee | |
| 6,840,555 | B1 | 1/2005 | Thompson | |
| 7,150,437 | B1 * | 12/2006 | Teeters | F16L 3/04 248/74.1 |
| 7,562,919 | B2 | 7/2009 | Lawley | |
| D619,878 | S | 7/2010 | Sjoeqvist | |
| D667,290 | S | 9/2012 | Chelton | |
| 8,297,002 | B2 | 10/2012 | Fernandez | |
| 8,448,406 | B2 | 5/2013 | Shepard | |
| 8,622,266 | B2 | 1/2014 | Mcmillan | |
| 8,667,755 | B1 | 3/2014 | Finfrock et al. | |
| 8,720,129 | B2 | 5/2014 | Sias et al. | |
| 8,870,135 | B2 | 10/2014 | Grubbs | |
| 9,775,260 | B1 | 9/2017 | Warlick et al. | |
| 9,845,576 | B2 * | 12/2017 | Penland, Jr. | B32B 3/18 |
| 10,323,439 | B2 * | 6/2019 | Liang | E05D 13/003 |
| 11,174,083 | B1 * | 11/2021 | Rivero | B65D 63/16 |
| 2007/0039265 | A1 | 2/2007 | Arcand et al. | |
| 2008/0217495 | A1 | 9/2008 | Roepke | |
| 2013/0318896 | A1 | 12/2013 | Rogers | |
| 2014/0053475 | A1 | 2/2014 | Siqueiros | |
| 2015/0284948 | A1 | 10/2015 | Pozza et al. | |
| 2017/0121916 | A1 | 5/2017 | Penland et al. | |

FOREIGN PATENT DOCUMENTS

| | | | |
|---|---|---|---|
| JP | H05248095 | A | 9/1993 |
| JP | H0978840 | A | 3/1997 |
| JP | 2001019346 | A | 1/2001 |
| JP | 2004162276 | A | 6/2004 |
| JP | 2007238219 | A | 9/2007 |
| WO | 2007073108 | A1 | 6/2007 |
| WO | 2011015997 | A2 | 2/2011 |

OTHER PUBLICATIONS

"Extended European Search Report" , European Application No. 15822851.0 (10 pages) , Apr. 30, 2018.

"First Examination Report", Australian Application No. 2018282265 (4 pages) , Sep. 12, 2019.

"First Examination Report" , New Zealand Application No. 630423 (2 pages) , Sep. 24, 2014.

"FU-Tone.com, Model TR003" , https://web.archive.org/web/20140103033107/http://www.fu-tone.com:80/catalog/index.php?main_page=product_info&cPath=70&products_id=215 , Jan. 3, 2014.

"International Search Report and Written Opinion" , PCT/IB2015/000145 (17 pages) , Jul. 1, 2015.

* cited by examiner

LIFTING OF BUILDING UNITS

PRIORITY CLAIM

This patent application is a continuation of, and claims priority to and the benefit of U.S. patent application Ser. No. 16/924,803, filed on Jul. 9, 2020, which is a continuation of, and claims priority to and the benefit of U.S. patent application Ser. No. 15/326,353, filed on Jan. 13, 2017, now issued as U.S. Pat. No. 10,752,471, on Aug. 25, 2020, which is a national stage entry of PCT Application No. PCT/IB2015/000145, which was filed on Feb. 2, 2015, which claims priority to and the benefit of Australian Patent Application No. 2014902708, which was filed on Jul. 14, 2014, the entire contents of each of which are incorporated herein by reference.

FIELD

The present disclosure relates to lifting of a building unit, particularly (though not necessarily exclusively) a panel-like building unit, that may, for example, be for a ceiling, wall or floor, comprising exterior sheeting and an internal support structure over which the sheeting is disposed.

BACKGROUND

Initially, most domestic timber framed construction was carried out on site by carpenters using a high level of skill in cutting, fitting, and building structures from basic packs of timber. Such construction required considerable time, knowledge of materials, and attention to detail through the entire build process to ensure a serviceable result. Weather also played an important part in the build time as the whole process occurred on site. The structures were generally of basic post and beam construction using checked-in timber diagonals to provide lateral stability.

A significant early innovation in the field was the introduction of timber roof trusses. These were prefabricated offsite to factory tolerances and, because of their "truss action," could span much larger distances than conventional structures, with far less deflection and less timber. The roof structure was installed in a fraction of the time, was dimensionally accurate, and required far less skill to install. Offsite wall frame prefabrication followed, for the same reasons, to provide an engineered product, use of reduced materials and waste, and reduction of time and skilled labor on site. Again for the same reasons, floors followed suit, with the introduction of floor trusses and timber I-joists. More recently, light-gauge steel equivalent has been introduced to confer the same benefits as achieved by prefabrication of timber framing components.

Commonplace now is the delivery of packs of frames and trusses to site, with a team of three to five installers completing the erection of the structure of an average two-story house in two to three days. Most of the components are manually lifted into place, though relatively large and heavy parts may be lifted into place by crane.

There are a number of current trends, including trends towards smaller lot sizes, larger houses with more open spaces and a greater focus placed on site safety, which have given rise to comparatively more larger and heavier components and an increasing use of cranes, scaffolding and systems to protect installers working at heights, with attendant increases in site costs.

Offsite assembly of components into paneled units addresses these issues and significantly reduces installation time.

Provision for safe, cost-effective lifting of such units is highly desirable.

SUMMARY

According to a first aspect of the present disclosure, there is provided a building unit comprising sheeting and a support structure over which the sheeting is secured, the unit being provided with at least one lifting anchor that is connected to or incorporated into the support structure and is engaged or engageable by a component for lifting the unit such that a releasable interconnection between the component and the support structure passes through an opening in the sheeting.

Advantageously, lifting loads applied to the unit by the lifting component are thus transferred to the support structure by the interconnection(s).

The support structure may comprise a frame. Alternatively or additionally, the support structure may comprise, for example, a solid core or rigid foam; for example, the building unit may be a solid core panel, in which the solid core defines, or forms part of, the support structure.

In certain embodiments, the support structure comprises at least one truss and the or each anchor is connected to the truss so as to transfer into the support structure a lifting force applied to the anchor by the lifting component. The or each anchor may be connected to or integrated into a member, such as a chord, of the truss, on one side of which member the sheeting is supported, so as to transfer the lifting force into that member. In one embodiment of the present disclosure, the or each anchor extends through a through-hole in the member of the truss.

In certain embodiments, either or each of the lifting component and anchor is configured such that occlusion of the opening, following release of the interconnection, can be effected so as to form a surface that is substantially flush with an outer surface of the sheeting.

Advantageously, no part of the lifting component or anchor then projects beyond an outer surface of the sheeting.

The sheeting may comprise, for example, internal or external cladding, flooring material, or ceiling material. The sheeting may comprise, for example, plasterboard, particleboard, fiber cement board, or magnesium oxide/MGO board.

In certain embodiments, the building unit is a panel-like building unit. The building unit may be for a ceiling, wall, or floor. The building unit may be a floor cassette or panel, a roof module, or a wall panel.

In certain embodiments, the unit is provided with at least one plug configured receivable by the opening to plug the opening. In certain embodiments, the plug is configured such that a surface thereof lies substantially flush with an outer surface of the sheeting when the plug is received by the opening. In certain embodiments, the plug is resiliently deformable whereby to be press-fittable in the opening. Advantageously, no part of the lifting component or anchor then projects beyond the outer surface.

In an embodiment of the present disclosure, the or each anchor is recessed with respect to an outer surface of the sheeting and the opening is sized to receive the component such that the anchor is engaged or engageable thereby. In the case of that embodiment, it may be that the lifting component comprises a member, such as a strip or length of tape, configured with separate formations, such as teeth, arranged therealong and the anchor is configured with a pawl engageable with the formations such that axial insertion of the member through the opening causes successive ones of the formations to engage the anchor in a manner permitting further insertion of the member through the opening but precluding withdrawal of the member from the anchor. In certain embodiments, the anchor is configured with a slot into which the member is insertable such that the formations can engage the pawl. Either or each of the anchor/pawl and member may be formed from plastic, e.g., nylon, and the member and anchor may have a form similar to that of the tape and open case, respectively, of a cable tie. The member may be severable, e.g., by being cut, to effect the release of the interconnection. Alternatively, the lifting component may comprise a lifting clutch, which may be engageable with and disengageable from the anchor while in situ.

The or each anchor may comprise a head configured to be engaged by the lifting component. In one embodiment of the present disclosure, the head is an enlarged head, e.g., configured in the form of a hexagonal bolt head, whereby the lifting component engages an underside thereof. In another embodiment of the present disclosure, the head is configured with an eye through which a portion of the lifting component is receivable such that the lifting component and head are interengaged; for example, the head may be configured in the form of a toroid defining the eye.

The anchor may be displaceable, such as linearly or axially, through the opening, between a retracted position, in which it is recessed with respect to an outer surface of the sheeting, and an exposed position, in which it projects beyond the surface so as to be engageable or engaged by the component. In the case of that embodiment, the lifting component is a lifting clutch, which may be engageable with and disengageable from the anchor while in situ. In one embodiment of the present disclosure, the or each anchor is linearly or axially displaceable between the recessed and exposed positions.

The or each anchor may be threaded such that the displacement of the anchor can be effected by rotation thereof; to this end, the anchor comprises a shank, on which the thread of the anchor is formed, at an end of which shank the head is formed. In certain embodiments, the shank passes through the member of the truss. In certain embodiments, the head is configured so as to be engageable with a tool, such as a socket or key, operable to rotate the anchor and thus move it between its exposed and retracted positions.

Alternatively, the or each anchor may be slideable between the recessed and exposed positions thereof. In certain embodiments, the anchor then comprises a shank, at an end of which the head is formed, which shank passes through the member of the truss. The anchor may be gravitationally biased whereby to assume its recessed position when the head of the anchor is uppermost. Alternatively, the unit may be provided with biasing means arranged to urge the or each anchor toward its exposed position, being of sufficient strength to force the anchor into its exposed position irrespective of the orientation of the anchor. The or each biasing means may comprise a spring. The unit may be further provided with at least one plug, the or each plug being configured to engage the sheeting so as to occlude a respective opening whereby to force a respective the anchor, against a bias exerted by the biasing means, into a position in which it is recessed with respect to the surface. Regardless of whether the or each anchor is gravitationally biased or the unit is provided with biasing means arranged to urge the anchor to its exposed position, the unit may be provided with at least one member, such as a shelf, arranged to abut a respective anchor in its recessed position to preclude displacement of the anchor such that it is further recessed relative to the surface. Alternatively, the head may be sized so as to engage or rest against the support structure when the anchor is in its recessed position, so as to preclude displacement of the anchor such that it is further recessed relative to the surface. In the embodiment in which the or each anchor is slideable between the recessed and exposed positions, the anchor is configured with a stopper sufficiently large that it precludes displacement of the anchor beyond its exposed position and thus withdrawal of the anchor from the unit.

In an embodiment of the present disclosure, the anchor extends through the opening whereby it projects beyond an outer surface of the sheeting such that it is engaged or engageable by the component, and is disconnectable from the support structure whereby it can be removed. In the case of that embodiment, the lifting component may be a lifting clutch, which may be engageable with and disengageable from the anchor while in situ, or may comprise a fitting retained between a head of the anchor and the sheeting and be releasable by disconnection of the anchor from the support structure; for example, the lifting component may be a load ring comprising the fitting.

In certain embodiments, the unit is provided with plural the anchors mounted at spaced apart positions therein.

According to a second aspect of the present disclosure, there is provided a lifting attachment for a building unit comprising sheeting and a support structure over which the sheeting is disposed, the attachment being configured such that it can be connected to or integrated into the support structure and comprising a lifting anchor that, when the attachment is so connected or integrated, is engageable by a component for lifting the unit such that a releasable interconnection between the component and the support structure passes through an opening in the sheeting.

Advantageously, lifting loads applied to the unit by the lifting component are thus transferred to the support structure by the interconnection.

The support structure may comprise a frame. Alternatively or additionally, the support structure may comprise, for example, a solid core or rigid foam; for example, the building unit may be a solid core panel, in which the solid core defines, or forms part of, the support structure. In certain embodiments, the support structure comprises at least one truss and the attachment is connectable to or integratable into the truss so as to transfer into the support structure a lifting force applied to the anchor by the lifting component. The attachment may be able to be connected to or integrated into a member, such as a chord, of the truss, on one side of which member the sheeting is supported, so as to transfer the lifting force into that member. In one embodiment of the present disclosure, the anchor is configured so as to extend through a through-hole in the member of the truss. In certain embodiments, the building unit is panel-like building unit. The building unit may be for a ceiling, wall, or floor. The building unit may be a floor cassette or panel, a roof module, or a wall panel.

In certain embodiments, either or each of the lifting component and anchor is configured such that occlusion of the opening, following release of the interconnection, can be effected so as to form a surface that is substantially flush with an outer surface of the sheeting. Advantageously, no part of the lifting component or anchor then projects beyond an outer surface of the sheeting. The attachment may be provided in combination with at least one plug receivable by the opening to plug the opening. In certain embodiments, the plug is configured such that a surface thereof lies substantially flush with an outer surface of the sheeting when the plug is received by the opening. In certain embodiments, the plug is resiliently deformable whereby to be press-fittable in the opening. Advantageously, no part of the lifting component or anchor then projects beyond the outer surface.

The attachment according to an embodiment of the present disclosure is configured such that the anchor is recessed with respect to an outer surface of the sheeting, the opening being sized to receive the component such that the anchor is engaged or engageable thereby. In the case of that embodiment, the lifting component may comprise a lifting clutch, which may be engageable with and disengageable from the anchor while in situ. Alternatively, it may be that the lifting component comprises a member, such as a strip or length of tape, configured with separate formations, such as teeth, arranged therealong and the anchor is configured with a pawl engageable with the formations such that axial insertion of the member through the opening causes successive ones of the formations to engage the anchor in a manner permitting further insertion of the member through the opening but precluding withdrawal of the member from the anchor. In certain embodiments, the anchor is configured with a slot into which the member is insertable such that the formations can engage the pawl. Either or each of the anchor/pawl and member may be formed from plastic, e.g., nylon, and the member and anchor may have a form similar to that of the tape and open boss/case, respectively, of a cable tie. The member may be severable, e.g., by being cut, to effect the release of the interconnection. Where the lifting component comprises the member configured with separate formations, the attachment comprises a block that defines the anchor and is attachable to or integratable into the support structure.

The attachment may, alternatively, comprise a base, via which it can be mounted to the support structure, to which base the anchor is connected. According to one embodiment of the present disclosure, the support structure comprises a truss having a chord on one side of which the sheeting is supported, and the base is configured to engage the truss when mounted. In certain embodiments, the base comprises a wall that is arranged so as to abut an opposite side of the chord when the attachment is mounted so as to transfer into the chord a lifting force applied to the anchor by the lifting component ("chord-engaging wall"). In certain embodiments, the chord is configured with a through-hole extending between the sides thereof, and the attachment is configured such that the anchor extends from the chord-engaging wall into the through-hole. In certain embodiments, the chord-engaging wall is configured with apertures through which fasteners can be inserted to fix the chord-engaging wall against the opposite side.

In certain embodiments, the base comprises a wall arranged so as to be engaged with a web member of the truss when the attachment is mounted ("web member-engaging wall"). The web member-engaging wall may transfer into the web member loads applied to the anchor by the lifting component. In certain embodiments, web member-engaging wall is securable against a face of the web member or a strongback fixed to the web member, which is substantially perpendicular to the one side of the chord. In certain embodiments, the web member-engaging wall is configured in the form of a plate. The web member-engaging wall may be configured with apertures through which fasteners can be inserted to fix the reinforcing member against the strongback and/or web member. Alternatively, the web member-engaging wall may be configured in the form of a truss connector plate or nail plate having teeth that can be driven into the strong back/web member through the face thereof to secure the web member-engaging wall against that face.

In one embodiment of the present disclosure, the attachment includes both of the web member-engaging wall and the chord-engaging wall, and the web member-engaging wall extends substantially perpendicular to the chord-engaging wall. In that embodiment, the base comprises an L-shaped member defining the chord-engaging wall and the web member-engaging wall, that may, for example, be formed by bending a single piece or strip of plate.

The anchor may comprise a head configured to be engaged by the lifting component. In one embodiment of the present disclosure, the head is an enlarged head, e.g., configured in the form of a hexagonal bolt head, whereby the lifting component engages an underside thereof. In another embodiment of the present disclosure, the head is configured with an eye through which a portion of the lifting component is receivable such that the lifting component and head are interengaged; for example, the head may be configured in the form of a toroid defining the eye.

The anchor may be displaceable, such as linearly or axially, relative to the base between a position in which it is either recessed with respect to an outer surface of the sheeting or released from the base whereby to be removable, and an exposed position in which it projects beyond the surface so as to be engageable by the lifting component.

In the attachment according to one embodiment of the present disclosure, the anchor and base are configured with mating threads via which they are interengaged such that the displacement of the anchor can be effected by rotation of the anchor relative to the base. In certain embodiments, the anchor in that attachment comprises a shank, on which the thread of the anchor is formed, at an end of which shank the head is formed. In certain embodiments, the attachment is configured such that the shank passes through a hole in the chord-engaging wall when the base is mounted to or integrated into the support structure. In that embodiment, the chord-engaging wall is configured such that a first side thereof is receivable against the opposite side of the chord, the base further comprises a boss arranged on a second side of the chord-engaging wall which is opposite to the first side, and the boss is connected to the wall and formed with an internal thread defining the thread of the base. In certain embodiments, the boss is defined by an insert a portion of which passes through the hole in the chord-engaging wall and is deformed so as to engage the chord-engaging wall either side of the hole, whereby the boss is swaged to the chord-engaging wall. Alternatively, the boss may be defined, for example, by a nut attached, such as by welding, to the second side. In certain embodiments, the head is configured so as to be engageable with a tool, such as a socket, operable to rotate the anchor and thus move it between its exposed and retracted positions.

According to a third aspect of the present disclosure, there is provided a method of forming the attachment, wherein the insert is passed through the hole in the chord-engaging wall and then deformed so as to engage the chord-engaging wall either side of the hole, whereby the boss is connected to the chord-engaging wall.

In the attachment according to another embodiment of the present disclosure, the anchor is slideable relative to the base between the recessed and exposed positions thereof. In certain embodiments, the anchor in that attachment comprises a shank at an end of which shank the head is formed. In certain embodiments, the attachment is configured such that the shank passes through a hole in the chord-engaging wall when the base is mounted to or integrated into the support structure. In that embodiment, the chord-engaging wall is configured such that a first side thereof is receivable against the opposite side of the chord. The anchor may be gravitationally biased whereby to assume its recessed position when the attachment is orientated such that the head of the anchor is uppermost. Alternatively, the attachment may include biasing means arranged to urge the anchor toward its exposed position, being of sufficient strength to force the anchor into its exposed position irrespective of the orientation of the anchor. The biasing means may comprise a spring. The attachment may be provided in combination with a plug, which is configured to engage the sheeting and is configured to occlude the opening whereby to force the anchor, against a bias exerted by the biasing means, into a position in which it is recessed with respect to the surface. Regardless of whether the anchor is gravitationally biased or the attachment includes the biasing means, the attachment may include at least one member, such as a shelf, arranged to abut the anchor in its recessed position to preclude displacement of the anchor such that it is further recessed relative to the surface. Alternatively, the head may be sized so as to engage or rest against the support structure when the anchor is in its recessed position, so as to preclude displacement of the anchor such that it is further recessed relative to the surface. In certain embodiments in which the anchor is slideable between the recessed and exposed positions, the anchor is configured with a stopper sufficiently large that it precludes displacement of the anchor beyond its exposed position and thus withdrawal of the anchor from the base.

The attachment according to an embodiment of the present disclosure is configured such that the anchor extends through the opening whereby it projects beyond an outer surface of the sheeting such that it is engageable by the component, and is disconnectable from the base whereby it can be removed from the unit. In the case of that embodiment, the lifting component may be a lifting clutch, which may be engageable with and disengageable from the anchor while in situ, or may comprise a fitting retainable between a head of the anchor and the sheeting and releasable by disconnection of the anchor from the base; for example, the lifting component may be a load ring comprising the fitting.

In another embodiment of the present disclosure, the anchor is slideable relative to the base. In certain embodiments, the anchor in that embodiment comprises a shank, at an end of which the head is formed, which shank passes through a hole in the chord-engaging wall. The anchor, in that embodiment, may be gravitationally biased whereby to assume its recessed position when the head of the anchor is uppermost. Alternatively, the attachment may include a biasing means, such as a spring, arranged to urge the anchor toward its exposed position, being of sufficient strength to force the anchor into its exposed position irrespective of the orientation of the anchor, and there may be provided a combination comprising the attachment and a plug that is configured to engage the sheeting so as to occlude the opening whereby to force the anchor, against a bias exerted by the biasing means, into a position in which it is recessed with respect to the surface. In certain embodiments, the plug is insertable into the opening whereby to form an interference fit with the sheeting. In certain embodiments, the plug is configured such that, when inserted into the opening, it does not protrude, either appreciably or at all, beyond the surface.

Regardless of whether the anchor is gravitationally biased or the attachment includes biasing means arranged to urge the anchor to its exposed position, the base may be configured so as to abut the anchor in its recessed position to preclude displacement of the anchor such that it is further recessed relative to the surface. Where the base is so configured, it is formed with a shelf arranged to abut the anchor when in its recessed position. Alternatively, the head may be sized so as to engage or rest against the support structure when the anchor is in its recessed position, so as to preclude displacement of the anchor such that it is further recessed relative to the surface. In the embodiment in which the anchor is slideable relative to the base, the anchor is configured with a stopper sufficiently large that it engages the chord-engaging wall when the anchor is in its exposed position, whereby to preclude withdrawal of the anchor through the hole in the chord-engaging wall. In the embodiment, the hole in the chord-engaging wall is defined by a slot having a section sized to permit passage of the stopper therethrough ("wide section") and a section sized to preclude passage of the stopper therethrough ("narrow section"), whereby the anchor, once inserted through the opening, can be interlockingly coupled to the chord-engaging wall by insertion of the stopper through the wide section and thence displacement of the base relative to the anchor such that the anchor passes through the narrow section and the stopper is thus positioned to engage the chord-engaging wall when the anchor is in its exposed position. In one embodiment of the present disclosure, the base includes the web member-engaging wall and the slot is configured such that the displacement of the base relative to the anchor brings the web member-engaging wall against the face of the web member or strongback fixed to the web member whereby it can be secured to that face.

According to a fourth aspect of the present disclosure, there is provided a method of mounting the lifting attachment to the building unit, comprising inserting the anchor through the opening and effecting receipt thereof through the wide section, then effecting displacement of the base relative to the anchor such that the anchor passes through the narrow section and the stopper is thus positioned to engage the chord-engaging wall when the anchor is in its exposed position, then securing the base to the support structure. In certain embodiments, the base includes the web member-engaging wall, the displacement of the base relative to the anchor brings the web member-engaging wall against the face of the web member or strongback fixed to the web member, and securing the base to the support structure comprises securing the web member-engaging wall to that face.

In certain embodiments, the base comprises a bracket that defines the wall(s).

According to a fifth aspect of the present disclosure, there is provided the unit provided with at least one attachment as defined above connected to or integrated into the support structure of the unit. In certain embodiments, plural the attachments are mounted to or integrated into the support structure at spaced positions.

According to a sixth aspect of the present disclosure, there is provided a combination comprising the attachment and the lifting component.

In certain embodiments, the combination further comprises the plug.

BRIEF DESCRIPTION OF THE DRAWINGS

The present disclosure will now be described, by way of non-limiting example only, with reference to the accompanying drawings.

DETAILED DESCRIPTION

Figure 1A:
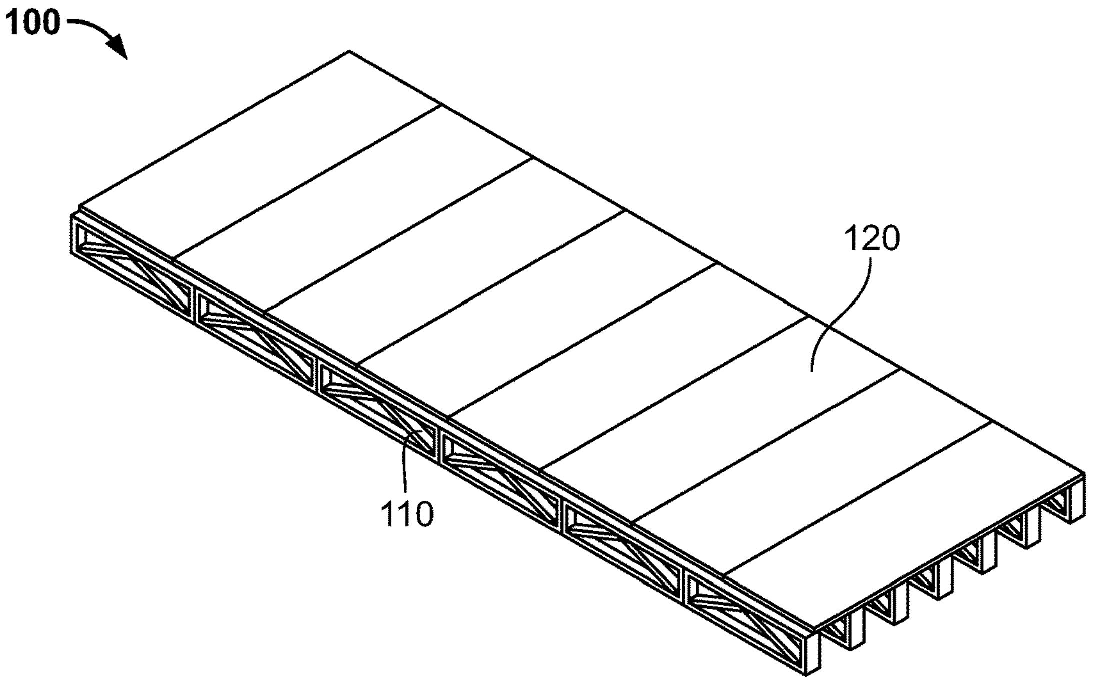
FIGS. 1A to 1C show details of a building unit into which can be incorporated one or more lifting attachments in accordance with one embodiment of the present disclosure.
Figure 1B:
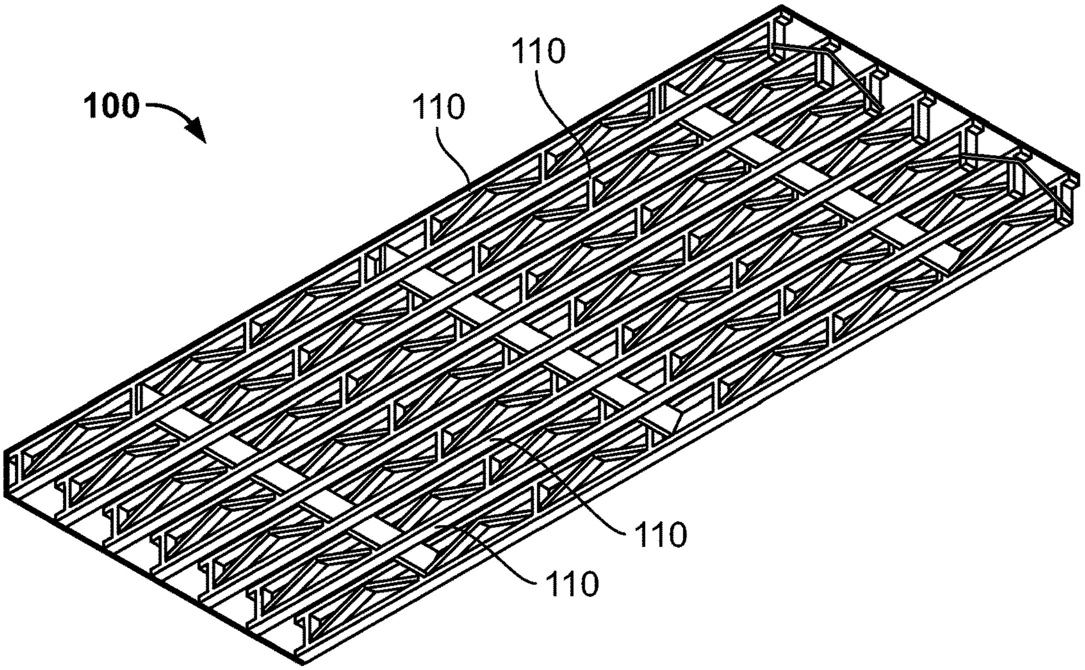
Figure 1C:
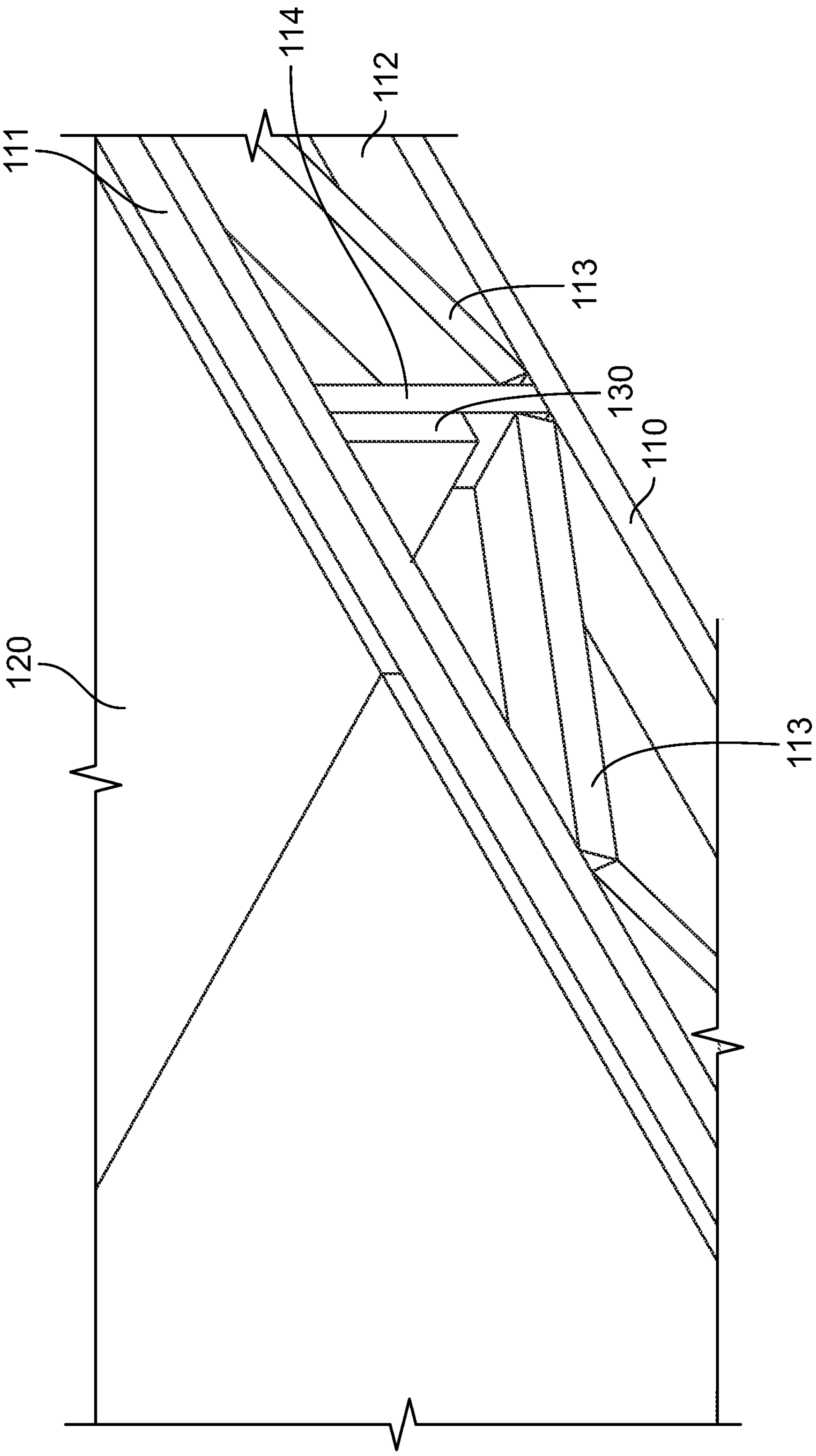

The embodiments of the present disclosure provide improvements with respect to lifting of a building unit 100, shown in FIG. 1A, being a panel-like unit that may, for example, be for a ceiling, wall, or floor. The unit 100 may, more particularly, be a floor cassette or panel, a roof module, or a wall panel. Referring also to FIGS. 1B and 1C, the unit 100 comprises spaced apart trusses 110 and sheeting 120 (that may be formed, for example, from particleboard) fixed to and supported on the trusses 110. Each truss 110 comprises parallel top and bottom chords 111 and 112, diagonal webs 113, and at least one transverse or upright web 114. The chords 111 and 112 and/or webs 113 and 114 may be formed, for example, from timber or metal, e.g., steel. Where the chords and webs comprise ones of timber, each truss includes nail plates 115 that reinforce interconnections between the webs 113 and 114 and chords 111 and 112. The unit 100 further comprises at least one strongback 130, likewise able to be formed from timber or metal (e.g., steel), secured to aligned webs 114 of the trusses 110, thereby interconnecting them. Sheeting 120 is secured against upper faces of the top chords 111.

Figure 2A:
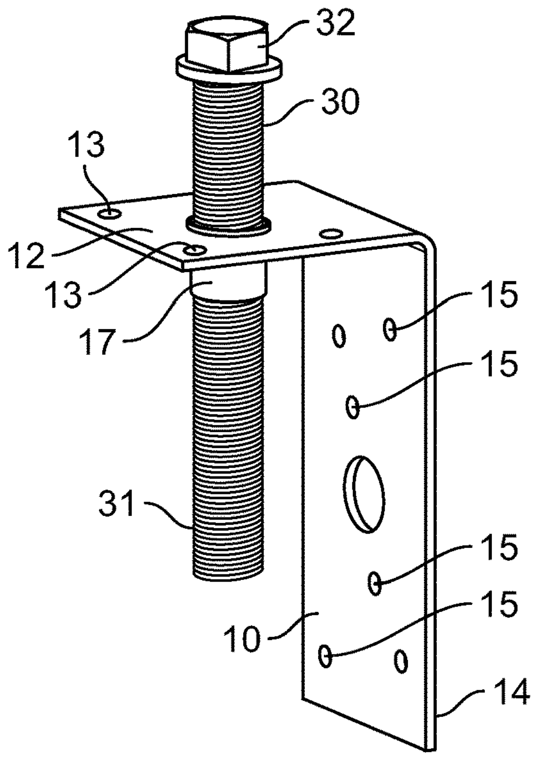
FIG. 2A shows a lifting attachment according to one embodiment of the present disclosure.
Figure 4A:
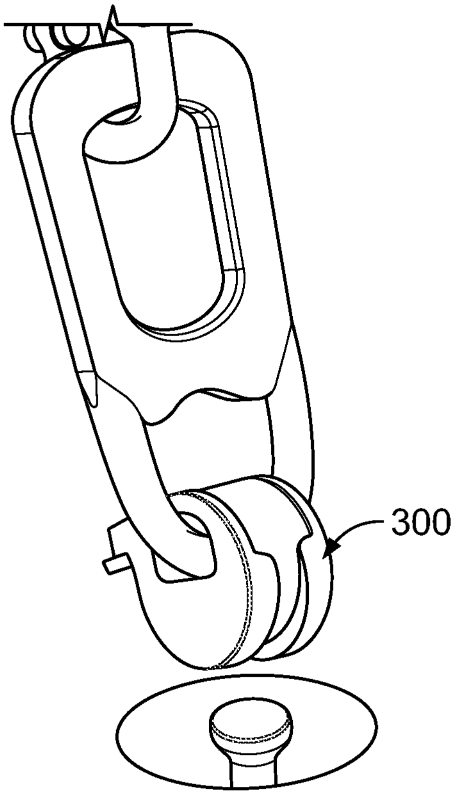
FIG. 4A shows a typical lifting clutch engageable with the lifting attachment of FIG. 2A and with lifting attachments according to other embodiments of the present disclosure.
Figure 4B:
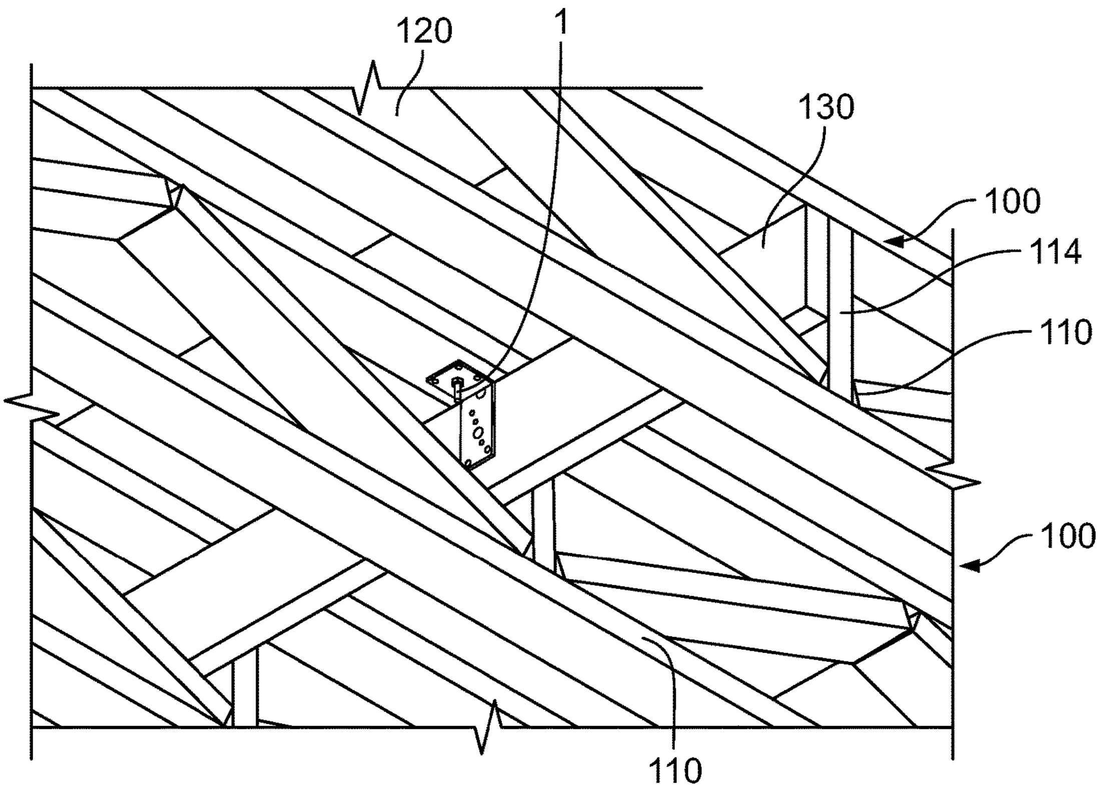
FIG. 4B shows the attachment of FIG. 2A in situ.
Figure 4C:
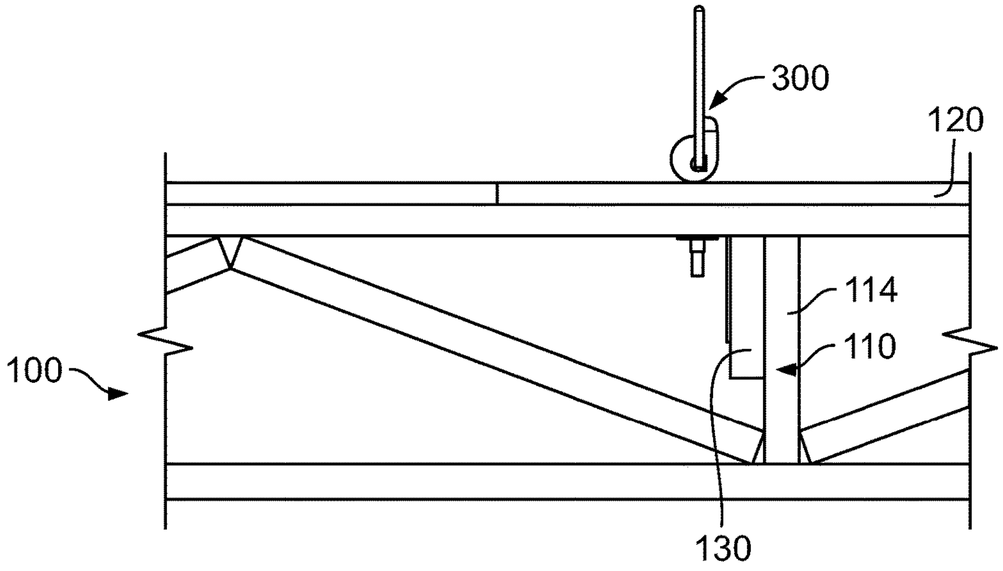
FIGS. 4C and 4D show the attachment depicted in FIG. 4B being engaged by a lifting clutch.
Figure 4D:
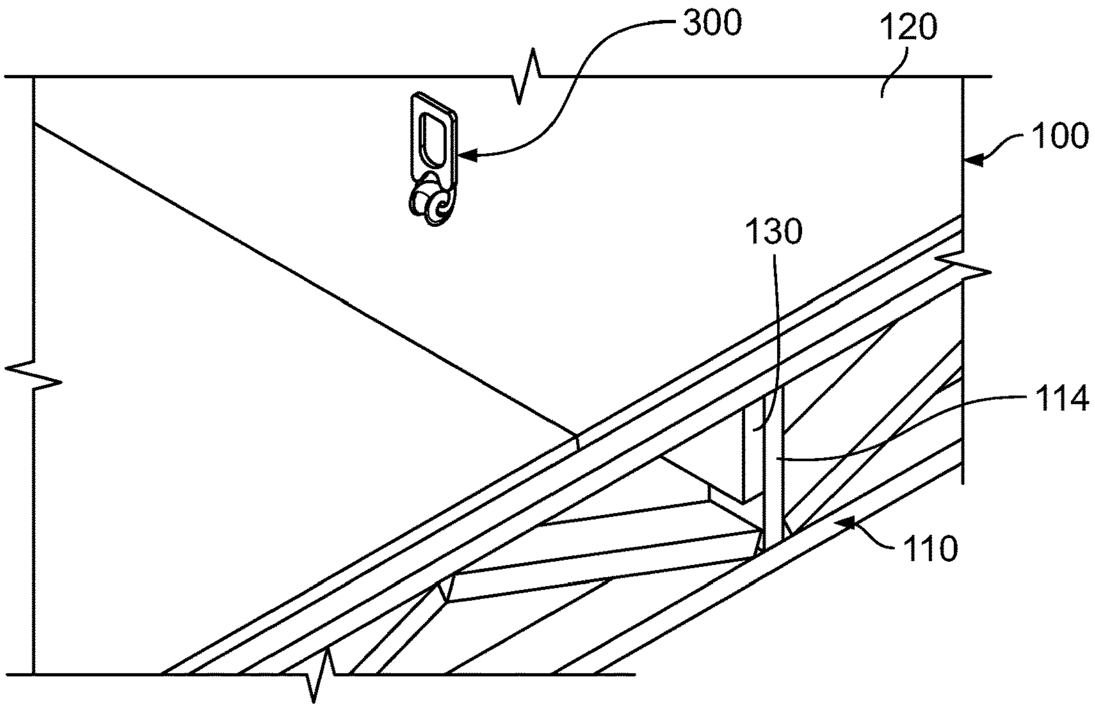
Figure 4E:
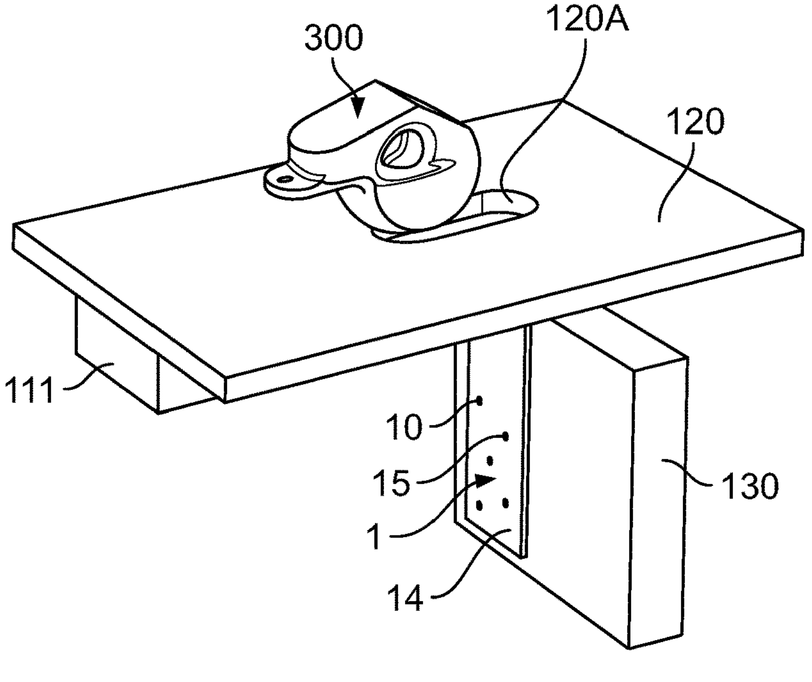
FIG. 4E is another view of a typical lifting clutch engageable with the lifting attachment of FIG. 2A and with lifting attachments according to other embodiments of the present disclosure.

Referring to FIG. 2A, an attachment 1 according to a first embodiment of the present disclosure is designed so as to be applied to the unit 100 so as to render it liftable by a lifting clutch 300, shown in FIGS. 4A and 4E, of the kind commonly used by transport and crane companies, e.g., a Reid Swiflift™ clutch. The attachment 1 comprises a base 10, via which it is mountable to the unit 100 (in a manner that will be described later), and a lifting anchor 30 that is movably connected to the base 10 and defined by a hexagon flange bolt comprising a threaded shank 31 and a hexagon flange head 32.

The base 10 comprises an L-shaped bracket, formed by bending a piece of steel plate, defining a top wall 12 and a side wall 14 projecting substantially perpendicular to the top wall 12. The top wall 12 defines apertures 13 for receiving fasteners, as will be described in further detail later. The side wall 14, likewise, defines apertures 15 for receiving fasteners, as will also be described in further detail later.

Figure 2B:
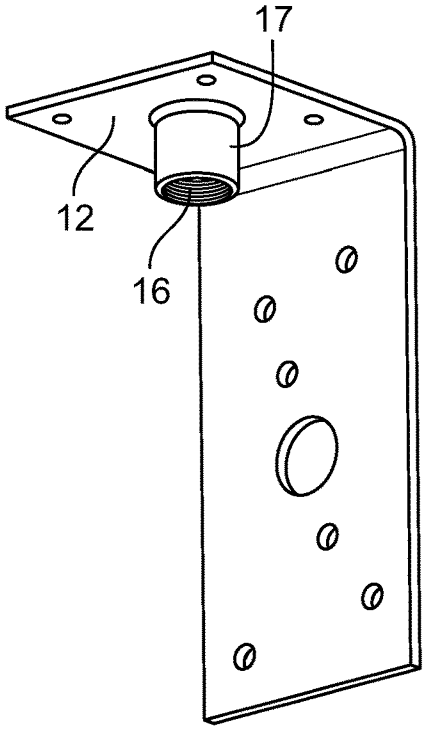
FIGS. 2B and 2C show a base of the attachment of FIG. 2A and an insert forming part of that base respectively.
Figure 2C:
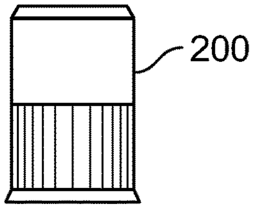
Figure 2D:
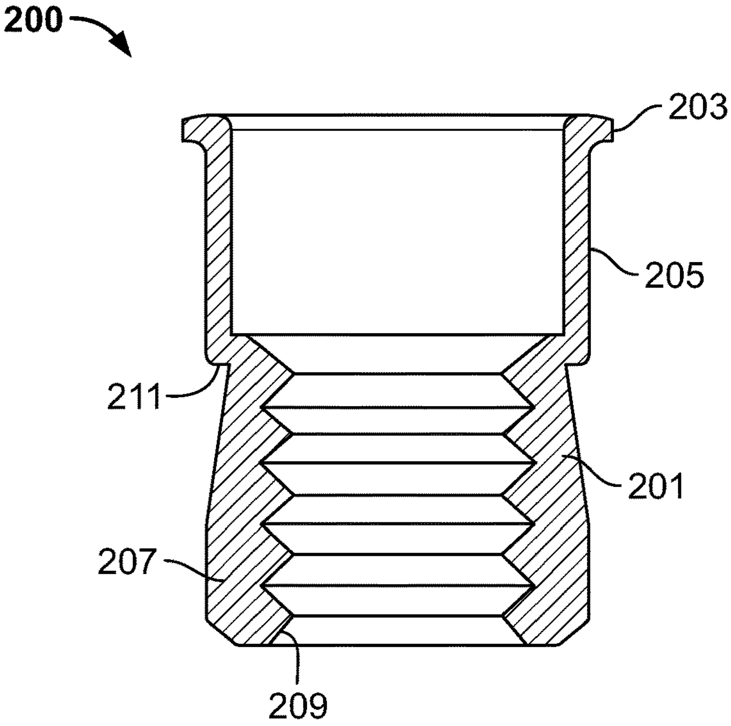
FIGS. 2D and 2E show how the insert is deformed to form part of the base of FIG. 2B.
Figure 2E:
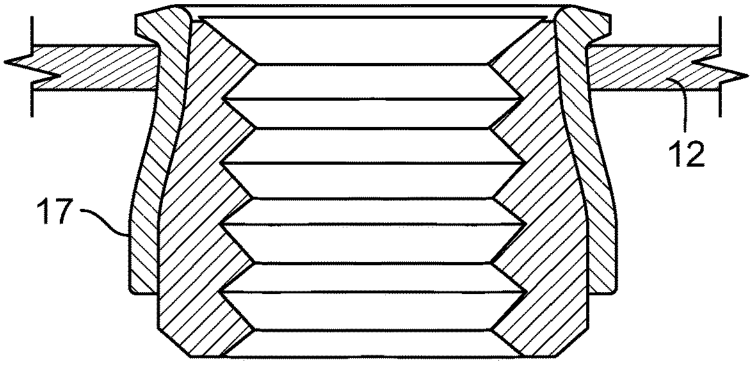

Referring also to FIG. 2B, which shows the base 10 on its own, a hole 16 is formed through the upper wall 12 to enable receipt of the shank 31 through the wall 12, and the base 10 further comprises an internally threaded cylindrical boss 17 defined by an insert (shown on its own in FIG. 2C) that has been inserted through the hole 16 and plastically deformed so as to be swaged to the wall 12. The insert 200, shown schematically in undeformed and deformed conditions in FIGS. 2D and 2E respectively, comprises a generally cylindrical body 201 and an annular flange 203 arranged at an end of the body 201. The body 201 comprises a first portion 205, at one end of which the flange 203 is arranged, and a second portion 207, which extends from the other end of the portion 205 and defines internal thread 209. The second portion 207 diverges about a central longitudinal axis of the insert 200, in a direction away from the portion 205. The insert 200 is inserted into the hole 16 such that the flange 203 rests against the upper side of the wall 12. Thereafter, a compressive load is applied, in the direction of the longitudinal axis, to opposite ends of the insert 200, whereby shearing is effected at an annular interface 211 between the portions 205 and 207, such that the latter portion is displaced upwardly in the former portion, causing it to expand radially outwardly such that an underside of the wall 12 is engaged by the thus-expanded portion 205 and the upper side of the wall 12 is engaged by the flange 203, whereby there is a tight interlock between the insert 200 and the wall 12. Referring to FIG. 2B, the portion 205 is splined, promoting resistance of the boss 17 to rotation relative to the wall 12. A particularly suitable form of insert 200 is the Thin Sheet Nutsert™9658 series insert, shown in FIG. 2C, marketed by Avdel. The flange 203 is of relatively small thickness whereby its upper face is substantially flush with the upper surface of the wall 12.

Figure 5A:
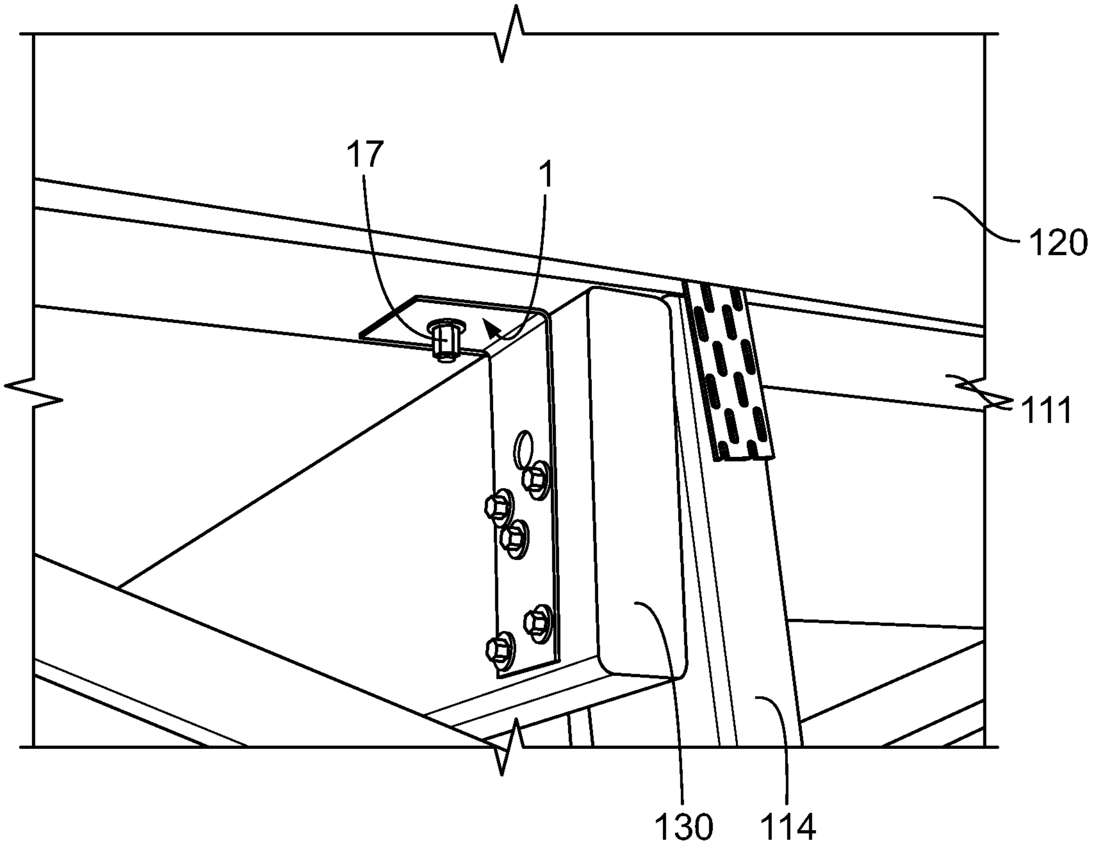
FIGS. 5A and 5B show how the attachment of FIG. 2A is installed in the building unit.
Figure 5B:
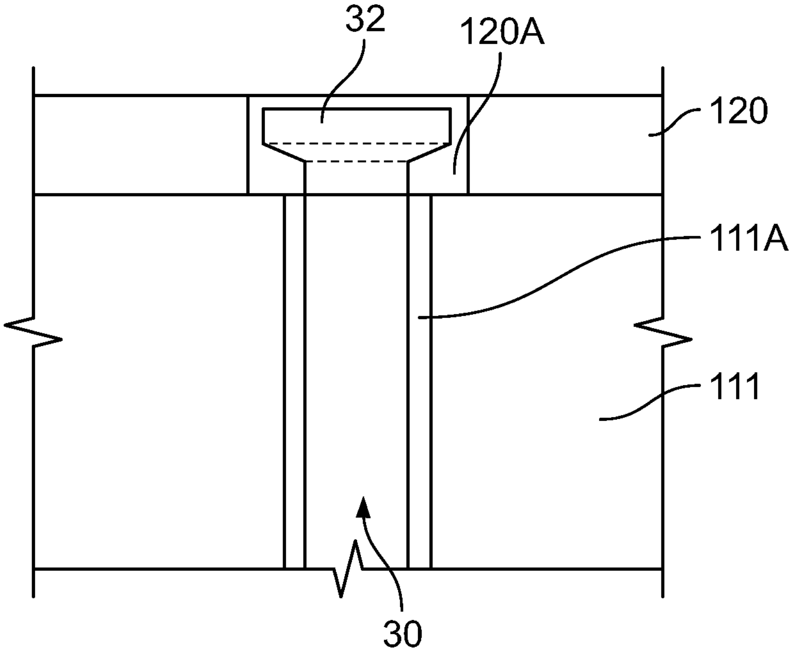

Referring to FIGS. 5A and 5B, fitting of the attachment 1 to the unit 100 involves positioning the base 10 such that the side wall 14 is received against strongback 130 and the top wall 12 is received against the underside of the truss 110. Fasteners, such as nails (particularly where the top chord 111/strongback 130 is timber), screws, or bolts, are then inserted or driven into apertures 13 and 15 to secure the walls 12 and 14 against the underside of the top chord 111 and an outer face of the strongback 130, respectively. Next, the anchor 30 is downwardly introduced shank-first into aligned holes 120A and 111A formed through the sheeting 120 and top chord 111 respectively, which holes align with the threaded bore of boss 17, and the anchor 30 is rotated such that the threads on the shank 31 engage with the internal thread of the boss 17, whereby the anchor 30 is screwed into the boss 17 and thus interconnected with the base 10, as shown in FIG. 5A. The hole 120A formed through the sheeting 120 is of a diameter slightly larger than the largest diameter of the head 32 (being the diameter of the annular flange of the head 32), whereby, when the anchor 30 is fully screwed down, the head 32 is countersunk in the sheeting 120, as shown in FIG. 5B. The hole formed through the top chord 111 is of a diameter smaller than that of the flange of the head 32 such that the latter abuts the top face of the chord 111 when the anchor 30 is fully screwed down. The thickness of the sheeting 120 is substantially equal to the depth of the head 32 such that the top surface of the head 32 is substantially flush with, or recessed with respect to, the exposed surface of the sheeting 120 when the anchor 30 is fully screwed down.

Figure 5C:
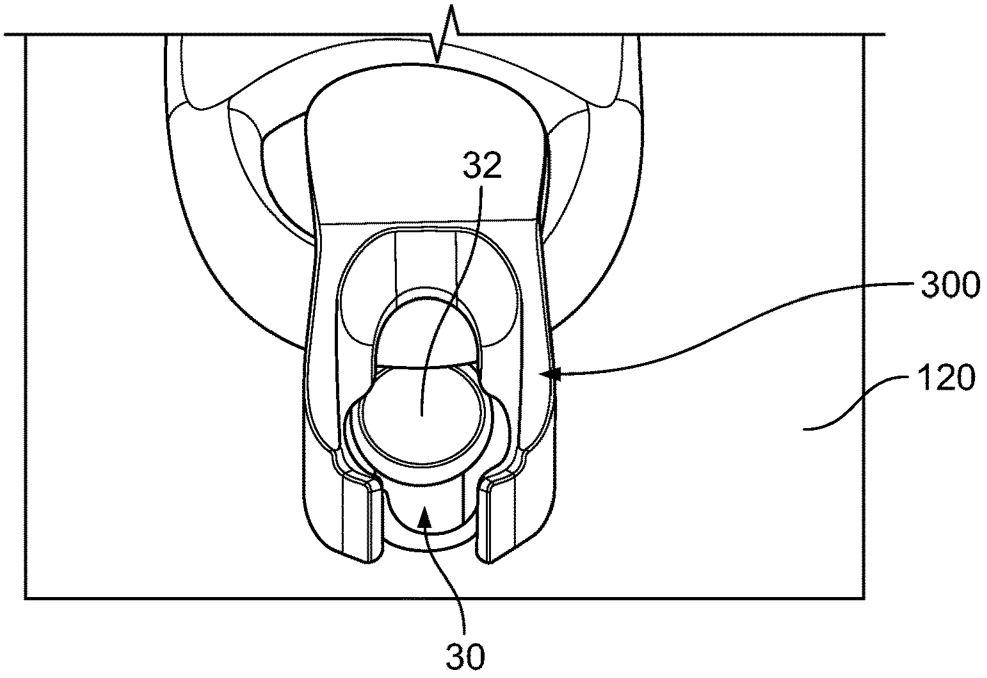
FIG. 5C is another view of a typical lifting clutch engaged with the installed lifting attachment shown in FIG. 5A.

The anchor 30 of the thus-installed attachment 1 is thus displaceable, relative to the base 10, between a position in which it is recessed with respect to the outer surface of the sheeting 120, and an exposed position, in which it projects beyond the outer surface such that the head 32 is engageable by a lifting clutch 300, as shown in FIG. 5C. Once the unit 100, as provided with the attachment(s) 1, has been lifted into position using the clutch(es) 300, and the/each clutch 300 has been disengaged, the head 32 can be rotated, by means of a tool, such as a socket wrench, such the anchor 30 either is screwed down, whereby to assume, its recessed or retracted position, or the anchor 30 can instead be unscrewed from the base 10 and thus released from the unit 100; either way, no part of the anchor 30 remains proud of the outer surface of the sheeting 120.

Figure 3:
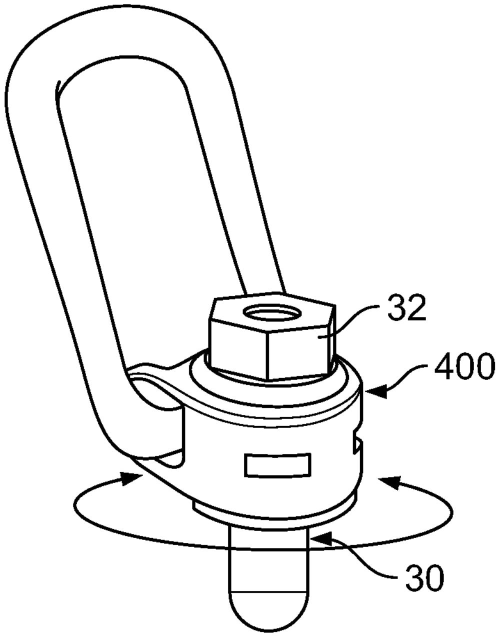
FIG. 3 shows details of an attachment embodying the present disclosure engaged by a load ring such that the building unit can be lifted.

FIG. 3 is a view of an alternative lifting component-anchor interconnection in accordance with an embodiment of the present disclosure (in which the base, sheeting, and trusses are not shown). The anchor 30 extends from the base through an opening in the sheeting, to project, proud of the sheeting, through a load ring 400, defining or forming part of a component for lifting the building unit, which load ring is thus retained between the head 32 and the sheeting 120. Once the building unit has been lifted via the load ring 400, the anchor 30 can be unscrewed from the base, whereby both it and the load ring 400 are released from the unit. In this arrangement, because the anchor 30 can be released from the base/unit, the sheeting and opening therein need not be dimensioned such that the anchor 30 can assume a position in which the top/outermost surface of the head 32 is substantially flush with, or recessed with respect to, the outer surface of the sheeting when the anchor 30 is fully screwed down.

In the forthcoming description of further embodiments of the present disclosure, the same reference numerals as have been used in respect of the first embodiment will be used to denote and refer to the same or corresponding features in the further embodiments.

Figure 6A:
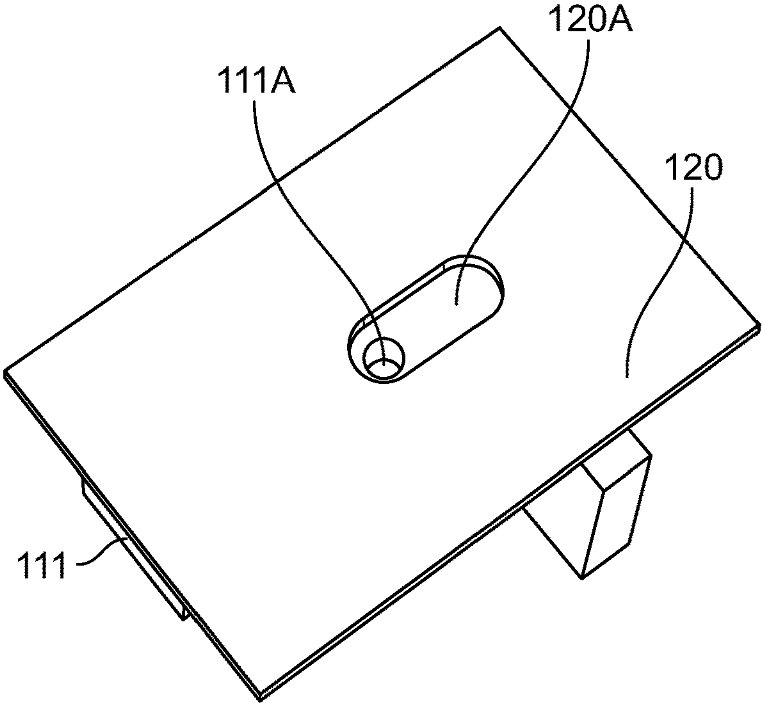
FIGS. 6A to 6F show details of a lifting attachment according to another embodiment of the present disclosure and the application of that attachment to the building unit.
Figure 6B:
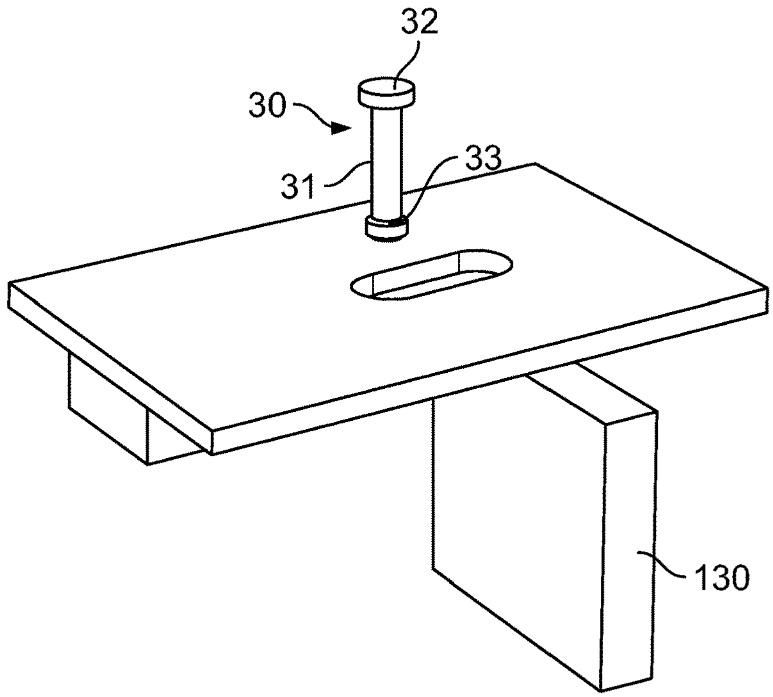
Figure 6C:
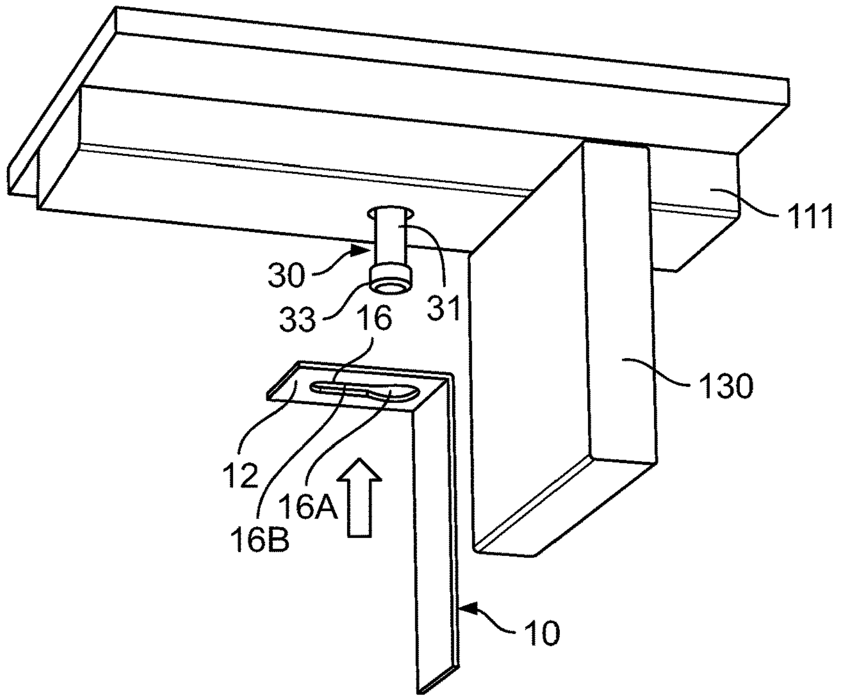
Figure 6D:
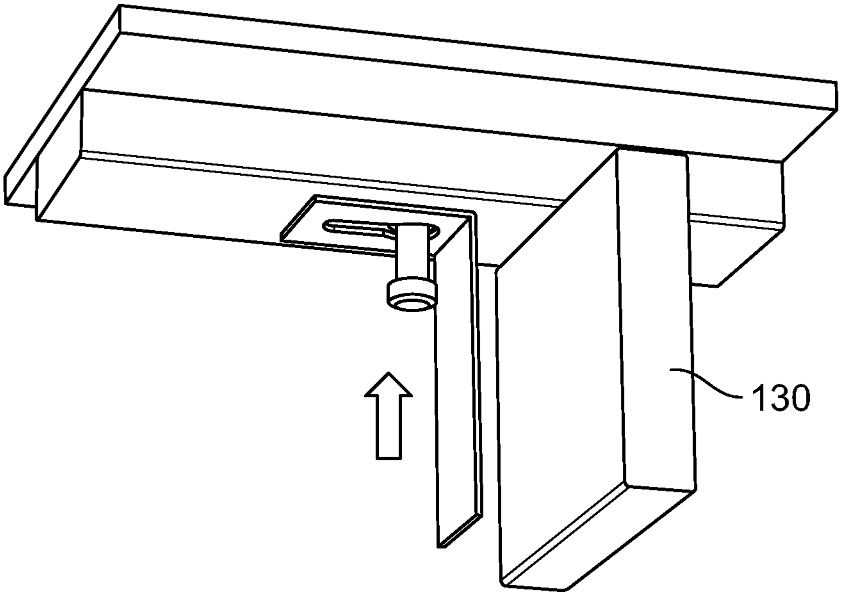
Figure 6E:
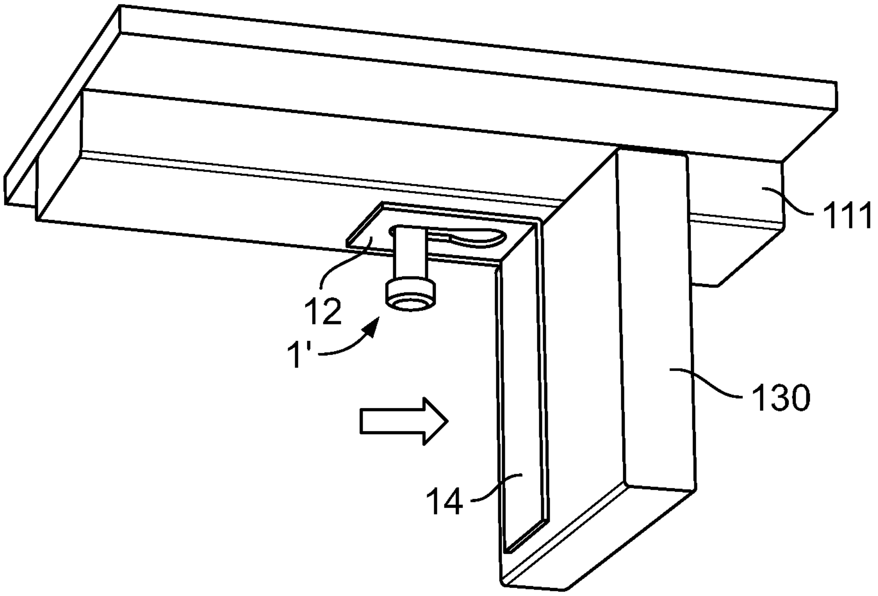

Referring to FIGS. 6A to 6F, and attachment 1' according to a second embodiment of the present disclosure and the application of that attachment to the unit 100, so as to render it liftable by lifting clutch 300, will now be described. Referring firstly to FIGS. 6C to 6E, the attachment 1' includes a base 10 comprising an L-shaped bracket, formed by bending a piece of steel plate, defining a top wall 12 and a side wall 14 projecting substantially perpendicular to the top wall 12. The top wall 12 may, like that in the attachment 1, be configured with apertures (not shown) for receiving fasteners to secure it against the top chord 111. The side wall 14 like that in the attachment 1, defines apertures 15 for receiving fasteners to secure it against the strongback 130. As can best be seen in FIG. 6C, the base 10 in the present embodiment does not have a boss, and the hole 16 in the upper wall 12 is defined by a slot having a wide section 16A and a narrow section 16B. The anchor 30 of the attachment 1', like that of the attachment 1, has a shank 31, which in the present embodiment is not threaded, and an enlarged head 32, which in the present embodiment is circular rather than generally hexagonal. The anchor 30 in the present embodiment further comprises a stopper 33 at a lower end of the shank 31. The stopper is sufficiently narrow that the anchor 30 can be lowered through hole 111A until the underside of the head 32 rests against the upper face of the top chord 111, at which point the head 32 is countersunk with respect to the exterior surface of the sheeting 120 and a lower end of the anchor 30 projects downwardly from the chord 111, as shown in FIG. 6C. The base 10, at this stage separate from the anchor 30, can then be raised whereby to effect insertion of the stopper 33 and shank 31 through the wide slot section 16A, such that the upper wall 12 is received against the underside of the top chord 111, as shown in FIG. 6D, and thereafter displaced laterally such that the shank extends through the narrow slot section 16B and the wall 14 is received against the strongback 130, as shown in FIG. 6E.

Fasteners are then inserted through the apertures 15 in the side wall 14 to secure the side wall 14 against the strongback 130. Fasteners may also be inserted through apertures 13 in the top wall 12 to secure it against the underside of the top chord 111.

Figure 6F:
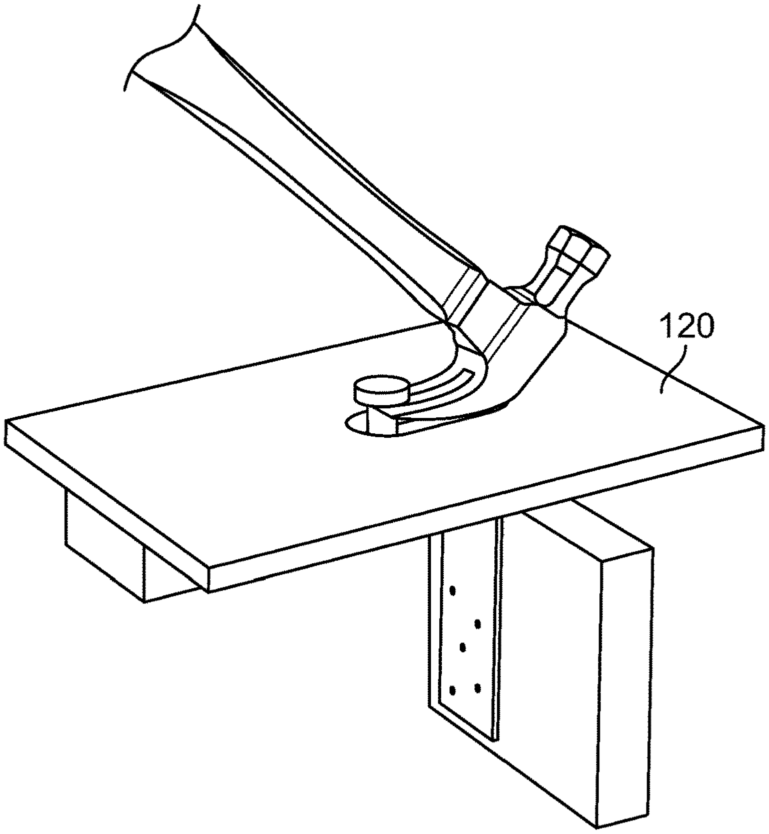

The width of the narrow slot section 16E is smaller than the diameter of the stopper 33, whereby withdrawal of the anchor 30 from the base 10 in the thus installed attachment 1' is precluded. In the attachment 1', the anchor 30, instead of being rotatable in the base 10 as in the attachment 1, is slideable relative to the base 10 whereby to be displaceable axially between a recessed position, in which the head 32 is countersunk in the sheeting 120 and the exposed position, in which the head 32 is exposed outward of the outer face of the panel 120 whereby to be engageable by clutch 300 as shown in FIG. 4B. In the attachment 1', the anchor 30 is gravitationally biased, whereby to assume its retracted position when the head 32 is uppermost. The anchor 30 can be displaced into its exposed position by engaging the underside of the head 32, e.g., with the claw of a claw hammer, as shown in FIG. 6F, for interconnection with the clutch 300. Without departure from the present disclosure, the attachment 1' may, instead, include biasing means (not shown) such as a spring, which urges the anchor 30 towards its exposed position, which may be of sufficient strength to force the anchor 30 into that position irrespective of the orientation of the anchor 30.

Figure 7A:
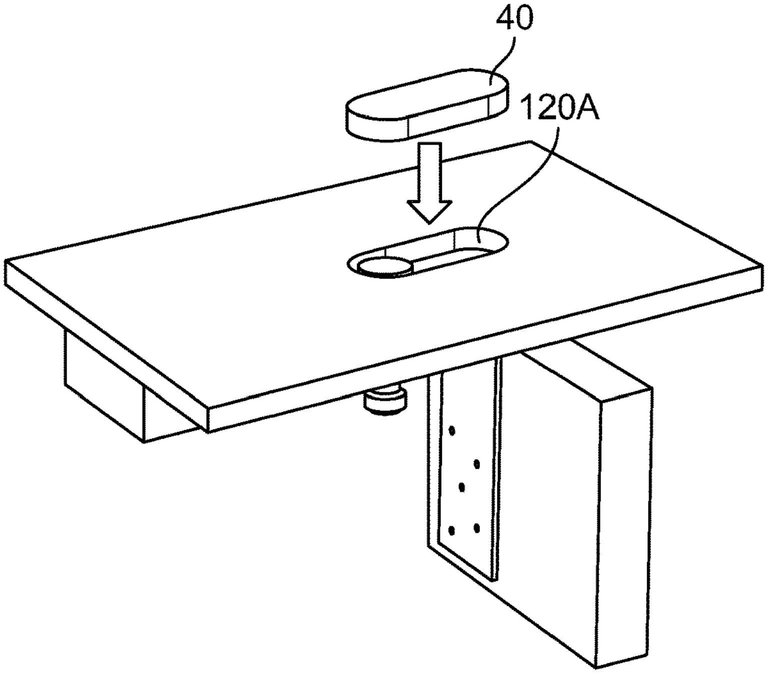
FIGS. 7A and 7B show fitting of a plug or cap into an opening in outer sheeting of the building unit to occlude the opening and thus cover a head of an anchor of the attachment of the attachment shown in FIG. 6E, once the unit has been lifted by and disengaged from the lifting clutch.
Figure 7B:
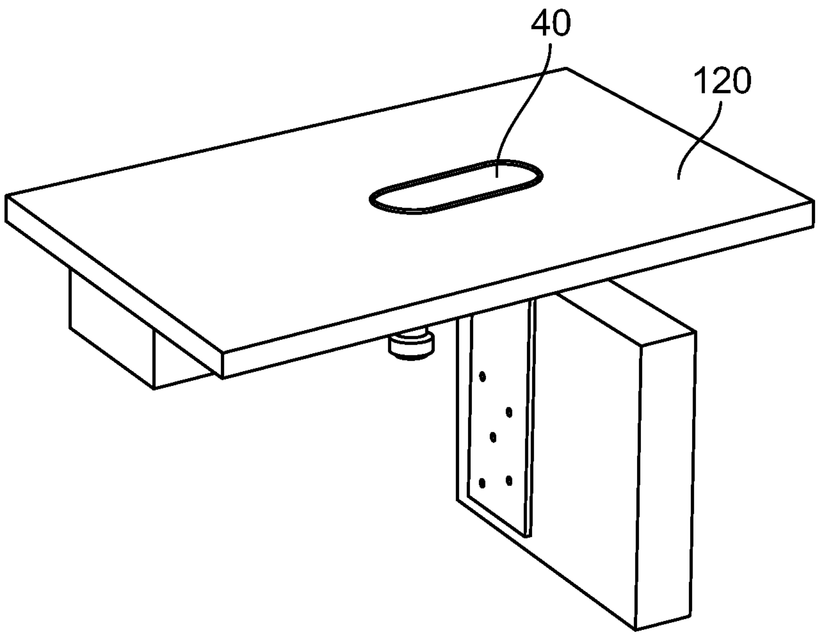
Figure 7C:
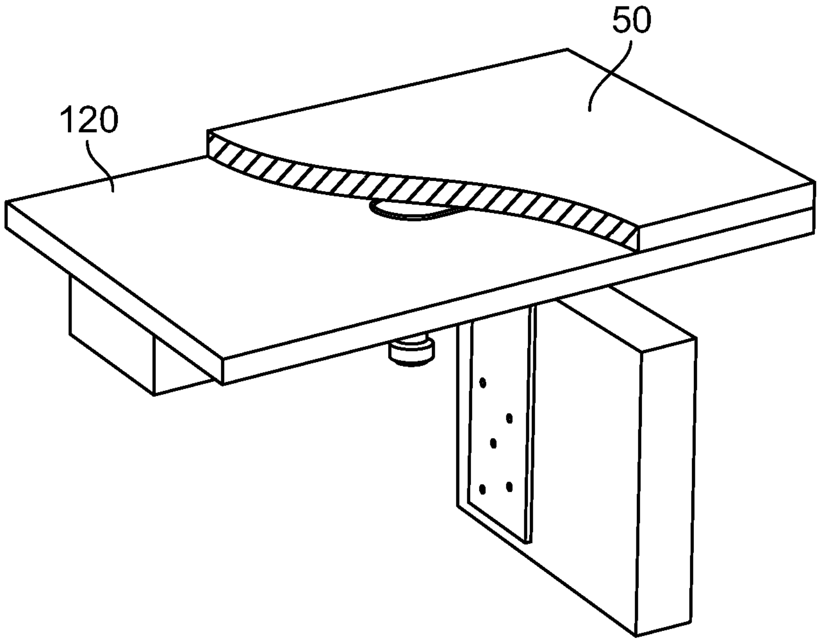
FIG. 7C shows the application of an overlay to the outer sheeting once the plug or cap has been installed.

Referring now to FIGS. 7A to 7C, once the unit 100 has been lifted into position and the clutch 300 disengaged from the anchor 1', a plug, in the form of a plastic cap 40, can be inserted into the opening 120A, thereby occluding that opening. The cap 40 is hollow and open at its lower end, whereby it accommodates the head 32 when inserted into the opening 120A and is configured such that an upper surface thereof lies substantially flush with the outer surface of the sheeting 120A. The cap 40 is resiliently deformable whereby it forms a press-fit in the opening 120A. Where the anchor is provided with the aforementioned biasing means, the press-fit is sufficient to overcome the force that biases the anchor 30 into its exposed position, whereby the inserted plug 40, and in particular the upper/outer surface thereof, holds the anchor 30 in a retracted position. If appropriate, an overlay 50 may thereafter be applied over the sheeting 120. It will be appreciated that the overlay 50 may, without departure from the present disclosure be so applied even if a plug 40 is not inserted into the/each opening 120A in the unit 100. Where the attachment includes the biasing means, it will then be the overlay 50 that forces the anchor into a retracted position against the bias.

Figure 8A:
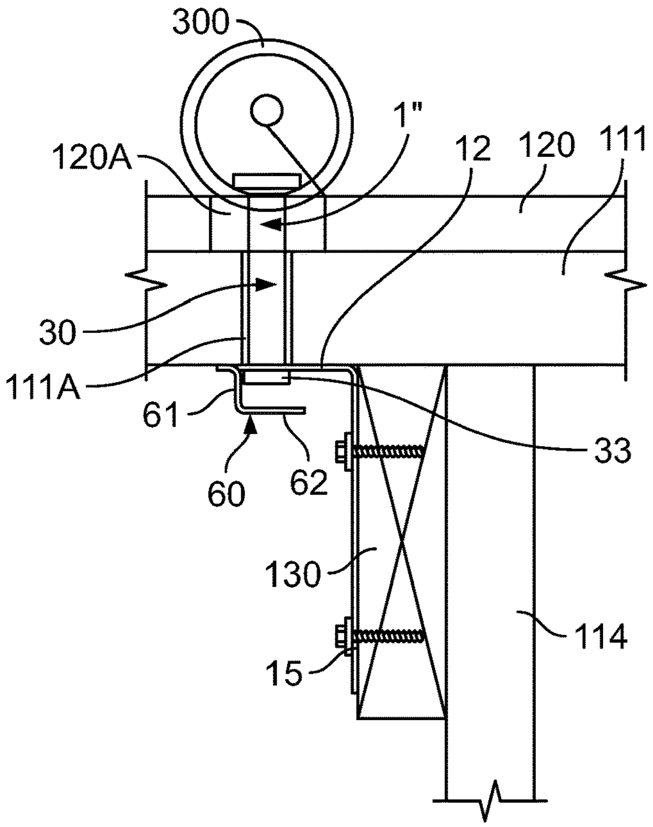
FIGS. 8A and 8B show details of an installed attachment in accordance with a further embodiment of the present disclosure.
Figure 8B:
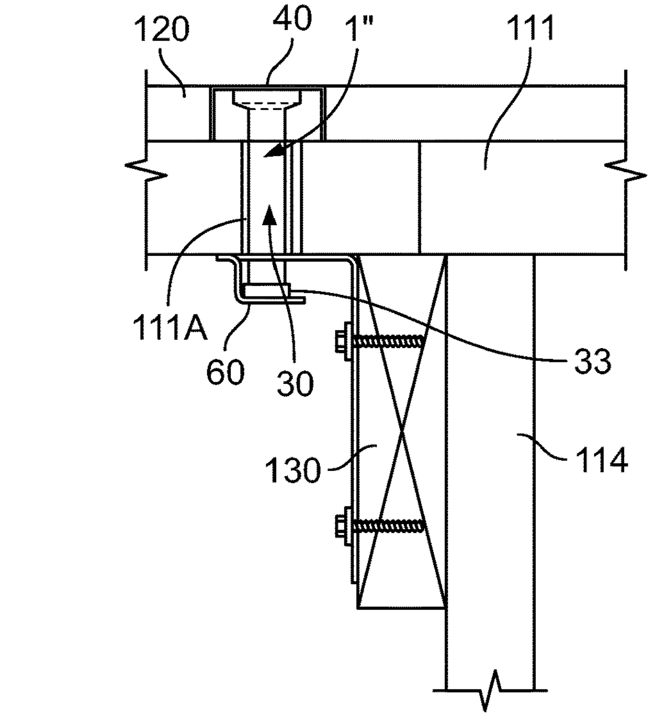

Shown schematically in FIGS. 8A and 8B, is an installed attachment 1" in accordance with a third embodiment of the present disclosure, in which the anchor 30 is in its extended/exposed and recessed/retracted positions respectively. The attachment 1" is substantially identical to the attachment 1' except that the base 10 is configured with an L-shaped support member 60 comprising an upright portion 61 that extends downwardly from the chord-engaging upper wall 12, and a shelf portion that extends laterally from a lower end of the portion 61 so as to underlie the stopper 33 and thus engage the stopper 33 to preclude retraction of the anchor 30 beyond its recessed/retracted position, and the head 32 is smaller in depth, as is allowable given it need not bottom out against the upper surface of the top chord 111 to preclude excessive retraction of the anchor 30.

Figure 8C:
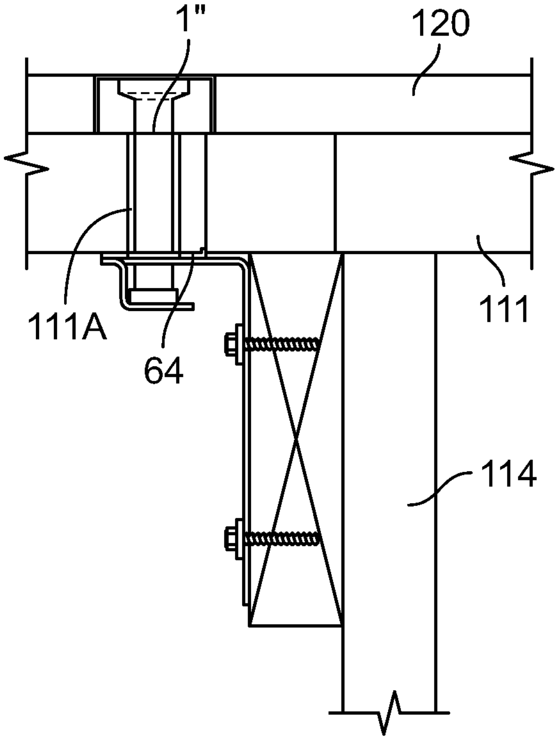
FIG. 8C shows a variation of the installation shown in FIGS. 8A and 8B, in which a washer is used to distribute loads from a stopper of the anchor into a greater area.

Referring to FIG. 8C, a washer 64 can, without departure from the present disclosure, be positioned between the wall 12 and the underside of the chord 111 to increase the bearing area through which lifting loads are transferred into the sheeting 120. The wall 12 thus can engage the chord 111 either directly, as shown in FIGS. 8A and 8B, or indirectly, as shown in FIG. 8C. The washer is in certain embodiments 3 mm thick because typical sheeting thicknesses are 19 mm and 22 mm so that if attachment 1' is dimensioned so as to be suitable for the latter thickness in the absence of washer 64, the employment of the washer 64 may render it suitable for the former thickness.

It will be appreciated that a cap/plug can be used with the/each attachment 1 in generally the same manner as with the attachments 1' and 1", as may overlay 50.

Figure 9:
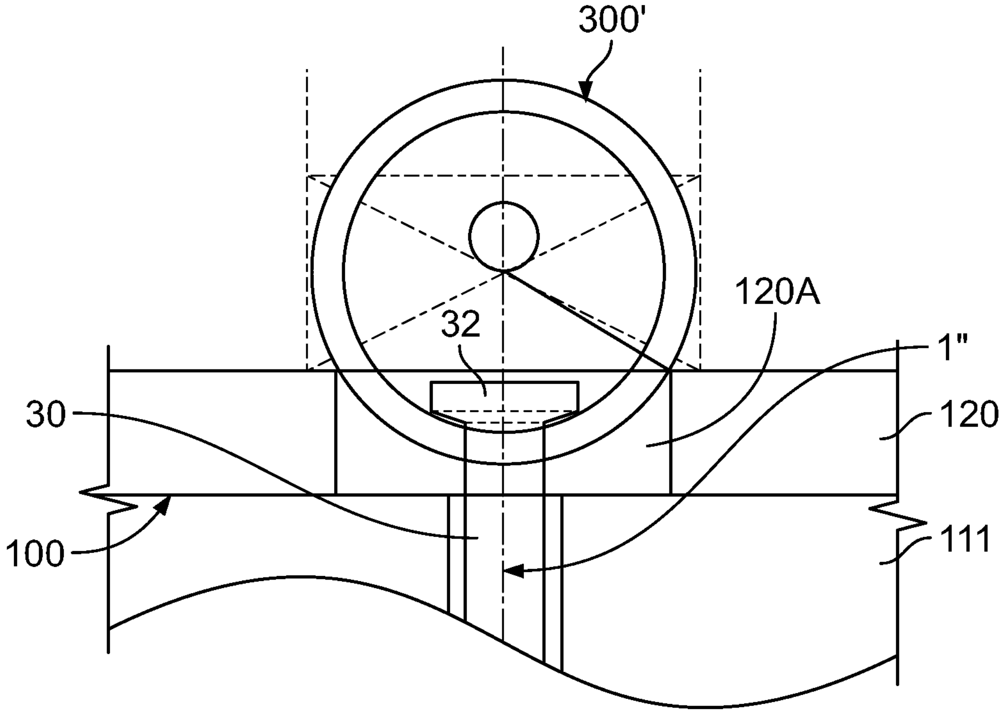
FIG. 9 shows details of an installed attachment according to another embodiment of the present disclosure engaged by another typical lifting clutch.

Shown schematically in FIG. 9 are details of an installed attachment 1''' according to a fourth embodiment of the present disclosure. In the attachment 1''', the anchor 30 is fixed relative to the base (not shown) and the head 32 remains countersunk within the opening 120A, which opening, in the case of this embodiment, may be larger and permit an appropriately configured lifting clutch 300' to engage the countersunk head 32. Again, in the case of this embodiment, a plug/cap, as described above, may be used to occlude the or each opening 120A after the unit 100 has been lifted into position and the clutch 300' disengaged from the respective anchor 1'''.

Figure 10:
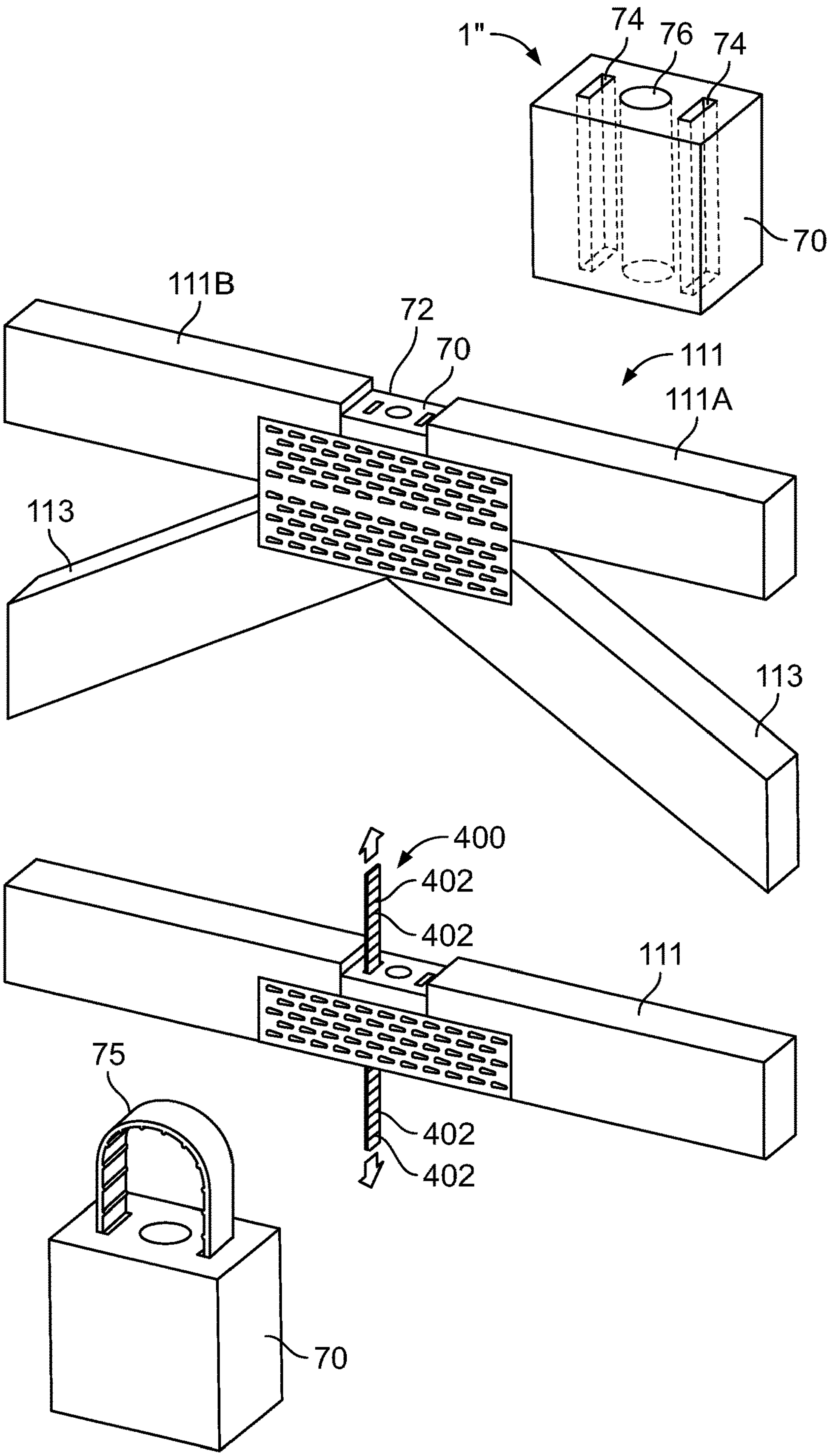
FIG. 10 shows details of an attachment according to a further embodiment of the present disclosure.

Shown in the FIG. 10 are details of an anchor 1'''' according to a fifth embodiment of the present disclosure. The anchor 1'''' comprises a block 70, which may be molded from plastic (e.g., nylon) and is incorporated into the top cord 111; for example, the block 70 may be received in a gap 72 between sections 111A and 111B of the top chord 111 and secured to those sections by a nail plate (as shown) and/or other means. The anchor 1'''' is thus recessed with respect to the outer surface of the sheeting 120 (not shown). The anchor 1'''' comprises at least one slot 74 extending from a top side thereof to a bottom side thereof, and is configured with a pawl (not shown) formed into the block 70 and arranged in the or each slot 74. The anchor 1'''' thus assumes a form consistent with that of the open boss/case of a cable tie. In the case of this embodiment, the lifting component, instead of being a clutch, comprises a strip 400, which may be formed from plastic (e.g., nylon), the strip being configured with separate teeth 402 arranged axially therealong, whereby axial insertion of an end of the strip 400 through the slot 74 causes successive ones of the teeth to engage the pawl within that slot, in a manner permitting further insertion of the strip 400 but precluding withdrawal of it from the block 70 (as a result of the operation of the pawl). Where the block 70 defines only one slot 74, one end of the strip 400 is inserted through the opening 120A and thence into the slot 74 (that is aligned with that opening), so as to engage the block as just described, and the strip projects outward of the outer surface of the sheeting 120 so as to be exposed for connection of a suitable lifting element thereto for the purposes of lifting the unit 100. Where the block defines two spaced apart slots 74, respective, opposed, ends of the strip 400 can be inserted into those slots 74 (that will both be aligned with the opening 120A or will be aligned with respective the openings 120A) as shown in the final diagram in FIG. 10, whereby the strip 400 forms a loop 75, defining the lifting component, that projects beyond the outer surface of the sheeting 120 such that part of a lifting element can be received therethrough to be engaged therewith for the purposes of lifting the unit 100. Once the unit 100 has been lifted, the strip 400 can be cut or otherwise severed such that no part thereof projects outside the opening(s) 120A. Thereafter, the or each opening 120A can, if appropriate, be plugged in the manner previously described.

The anchor 1'''' may, alternatively or additionally, be configured with a threaded hole 76 therethrough, the hole 76 being configured to interengage with a threaded anchor of any type previously described/illustrated, and thus essentially substituting for the base with which that threaded anchor interengages.

Advantageous aspects of embodiments as described above and illustrated in the drawings include:

- in those embodiments in which the anchor assumes a retracted position, the unit thickness can be minimized for transportation purposes;
- the support structure of the building unit can comprise or be formed from any one or more of several materials including timber and steel;
- where the anchor is configured with a head, that head (be it, for example, an enlarged head or an eye), can be "standard" so as to be engageable with a standard, commonly available, lifting clutch, that may be able to be released/disengaged remotely from the anchor, possibly eliminating the need for a person to work at height to effect the release/disengagement;
- in the embodiment in which the attachment/base comprises a bracket, the part of the bracket that fixes to the unit can be skewed so that it is much more easily fixed in the factory as its fixing points would be far more accessible; and
- particularly where the unit is a floor cassette, calculation of the centroid of mass of the unit enables the attachments/anchors to be positioned such that the unit is stable for lifting yet such that they are under where internal walls will be placed, so that there is no need for any remedial work required on site to cover the lifting points, since they will be covered by the walls.

While various embodiments of the present disclosure have been described above, it should be understood that they have been presented by way of example only, and not by way of limitation. It will be apparent to a person skilled in the relevant art that various changes in form and detail can be made therein without departing from the spirit and scope of the present disclosure. Thus, the present disclosure should not be limited by any of the above described exemplary embodiments.

Throughout this specification and the claims that follow, unless the context requires otherwise, the word "comprise", and variations such as "comprises" and "comprising", will be understood to imply the inclusion of a stated integer or step or group of integers or steps but not the exclusion of any other integer or step or group of integers or steps.

What is claimed is:

1. A building unit comprising:

a support structure; and sheeting disposable over the support structure, the sheeting defining an opening extending through the sheeting; and a lifting anchor including:

a block securely attached to the support structure by an anchor extending through a hole in the block, the block defining a slot and the block including a pawl extending into the slot, and a strip including a first end, a second end, and a tooth, the first end of the strip inserted into the slot in an insertion direction such that the insertion of the first end into the slot in the insertion direction causes the tooth of the strip to engage the pawl in the slot precluding withdrawal of the strip from the slot in a direction opposite to the insertion direction, and wherein the strip is insertable through the opening of the sheeting and above the sheeting.

2. The building unit of claim 1, wherein the support structure includes a chord, and the block is securely attached to the chord.

3. The building unit of claim 2, wherein the chord defines a gap, and the block is positioned in the gap.

4. The building unit of claim 2, wherein the chord defines a gap, the block is positioned in the gap, and the block is secured to the chord by a nail plate.

5. The building unit of claim 1, wherein the block is secured to the support structure by a nail plate.

6. The building unit of claim 1, wherein the slot extends from a first side of the block to a second side of the block.

7. The building unit of claim 6, wherein the first side of the block is a top side of the block, and the second side of the block is a bottom side of the block.

8. The building unit of claim 1, wherein the strip is directly engagable by a lifting element configured to lift the building unit.

9. The building unit of claim 1, wherein the slot is a first slot, the tooth is a first tooth, the pawl is a first pawl, wherein the block defines a second slot, the block includes a second pawl extending into the second slot, and wherein the second end of the strip is insertable into the second slot in a second insertion direction such that insertion of the second end into the second slot in the second insertion direction causes a second tooth of the strip to engage the second pawl in the second slot precluding withdrawal of the strip from the second slot in a direction opposite to the second insertion direction.

10. The building unit of claim 9, wherein the first slot and the second slot extend each from a first side of the block to a second side of the block.

11. The building unit of claim 10, wherein the first side of the block is a top side of the block, and the second side of the block is a bottom side of the block.

12. The building unit of claim 9, wherein the strip forms a loop that is directly engagable by a lifting element configured to lift the building unit.

13. A building unit comprising:

a support structure; and sheeting disposed over the support structure, the sheeting defining an opening extending through the sheeting; and a lifting anchor including:

a block securely attached to the support structure, and a strip including a first end, a second end, and a center portion between the first end and the second end, the first end of the strip attached to the block and the second end of the strip attached to the block such that center portion of the strip forms a loop extending through the opening of the sheeting and above the sheeting.

14. The building unit of claim 13, wherein the block defines a first slot, the block includes a first pawl extending into the first slot, and wherein the first end of the strip is insertable into the first slot in an insertion direction such that insertion of the first end into the first slot in the insertion direction causes a first tooth of the strip to engage the first pawl in the first slot precluding withdrawal of the strip from the first slot in a direction opposite to the insertion direction.

15. The building unit of claim 14, wherein the block defines a second slot, the block including a second pawl extending into the second slot, and wherein the second end of the strip is insertable into the second slot in the insertion direction such that insertion of the second end into the second slot in the insertion direction causes a second tooth of the strip to engage the second pawl in the second slot precluding withdrawal of the strip from the second slot in a direction opposite to the insertion direction.

16. The building unit of claim 13, wherein the support structure includes a chord, and the block is securely attached to the chord.

17. The building unit of claim 16, wherein the chord defines a gap, and the block is positioned in the gap.

* * * * *